US012583652B2

(12) United States Patent
Gebbink et al.

(10) Patent No.: US 12,583,652 B2
(45) Date of Patent: Mar. 24, 2026

(54) SEALING UNIT FOR A LIQUID CONTAINER

(71) Applicant: Smartseal AS, Stavanger (NO)

(72) Inventors: Jeroen Gerrit Anton Gebbink, Helmond (NL); Rune Kristian Knutsen, Stavanger (NO)

(73) Assignee: SmartSeal AS, Stavanger (NO)

( * ) Notice: Subject to any disclaimer, the term of this patent is extended or adjusted under 35 U.S.C. 154(b) by 139 days.

(21) Appl. No.: 18/705,630

(22) PCT Filed: Oct. 31, 2022

(86) PCT No.: PCT/EP2022/080393
§ 371 (c)(1),
(2) Date: Apr. 29, 2024

(87) PCT Pub. No.: WO2023/073237
PCT Pub. Date: May 4, 2023

(65) Prior Publication Data

US 2025/0128863 A1 Apr. 24, 2025

(30) Foreign Application Priority Data

Oct. 29, 2021 (NL) ..................................... 2029562

(51) Int. Cl.
*B65D 47/20* (2006.01)
*B65D 25/48* (2006.01)
(Continued)

(52) U.S. Cl.
CPC ......... *B65D 47/2093* (2013.01); *B65D 25/48* (2013.01); *B65D 47/20* (2013.01); *B65D 77/06* (2013.01); *B67D 7/00* (2013.01)

(58) Field of Classification Search
CPC ...... B65D 47/20; B65D 47/2093; B65D 1/02; B65D 1/10; B65D 25/48; B65D 77/06; B67D 7/00; B67D 7/76
(Continued)

(56) References Cited

U.S. PATENT DOCUMENTS 2,832,515 A * 4/1958 Barradas .............. A63B 53/007
222/541.6
4,623,076 A * 11/1986 Karpal ............... B65D 51/1688
222/545
(Continued)

FOREIGN PATENT DOCUMENTS

AU 775552 B2 8/2004
CN 110382368 A * 10/2019 ......... B65D 55/0863
WO WO-2020260709 A1 * 12/2020 ........... B65D 47/248

OTHER PUBLICATIONS

International Searching Authority; Written opinion of the International Searching Authority, International Search Report, and Notification of Transmittal of the International Search Report and the Written Opinion of the International Searching Authority, or the Declaration for corresponding international application No. PCT/EP2022/080393; Mar. 1, 2023.

*Primary Examiner* — David P Angwin
(74) *Attorney, Agent, or Firm* — McDonnell Boehnen Hulbert & Berghoff LLP

(57) ABSTRACT

A sealing unit comprising a male and a female sealing unit portion (300, 200) are provided for selectively sealing and opening a liquid container (100). The female sealing unit portion comprises a tubular element (210, 410) comprising a liquid passage (211) configured to be fixedly positioned relative to the container and a valve (220) with a tubular valve portion (229) axially movable between a closed and open position. The valve may comprise a flexible valve skirt portion (219) configured to bend when the tubular valve
(Continued)

portion is moved to the open position by an external axial force and to urge the tubular valve portion back from the open position to the closed portion when the external axial force is removed. The male sealing unit comprises a rigid operating tube (310) configured to be axially movable inside the liquid passage so as to engage the force receiving part of the valve portion and apply the external axial force to open the valve portion.

20 Claims, 12 Drawing Sheets

(51) Int. Cl.
*B65D 77/06* (2006.01)
*B67D 7/00* (2010.01)

(58) Field of Classification Search
USPC .............................................................. 222/1
See application file for complete search history.

(56) References Cited

U.S. PATENT DOCUMENTS

| | | | | |
|---|---|---|---|---|
| 5,609,195 | A * | 3/1997 | Stricklin | F16L 37/28<br>141/351 |
| 2008/0149638 | A1 * | 6/2008 | Van Hees | B65D 47/265<br>220/360 |
| 2019/0389634 | A1 * | 12/2019 | O'Brien | B65D 47/142 |
| 2020/0369449 | A1 * | 11/2020 | Nini | B65D 39/04 |

* cited by examiner

SEALING UNIT FOR A LIQUID CONTAINER

FIELD OF DISCLOSURE

The present disclosure relates to female sealing unit portion for selectively sealing and opening a container liquid opening in a liquid container for holding a liquid. The disclosure also relates to a male sealing unit portion for selectively operating a female sealing unit portion, to sealing unit comprising a female sealing unit portion and a male sealing unit portion, to an assembly of a liquid container and at least one of a female sealing unit portion and a male sealing unit portion, and to a method of selectively sealing and opening a container liquid opening in a liquid container.

BACKGROUND

Liquid containers are in common use in various lines of work, such as food service and medical care, as well in the home. Liquid containers may be embodied in a wide variety, ranging—for instance—from soft-walled containers such as (spouted) pouches to hard-walled container such as cans, canisters, etc.

Liquid containers in general may contain parts made of multiple types of materials, for example metal and plastic or multiple different kinds of plastic. Different parts may have different degrees of durability, and depending on their location and role, may be subject to different amounts of wear and tear.

Liquid containers are typically supplied full and used until they are empty, and therefore have a limited lifespan in use. However, at least some of their parts have a long technical lifespan, so that their use contributes to the accumulation of waste. This waste is often difficult to recycle because of the plurality of materials used. It would be preferable to provide long-lifespanned, easily recyclable, and/or reusable containers.

For providing reusable liquid containers it is preferable that the container may be filled and/or refilled via the same opening which is used to dispense liquid. In order to enable this a male-female connection may be used.

Such a system is known from Australian patent AU775552B2. Herein a rigid male element and a rigid female element may be moved relative to each other between two extreme positions. The male element may be coupled to a rigid plug element which is connected to the female element via flexible arms. The arrangement of these elements is such that in one extreme position of the male element a liquid passage through the female element is closed by the plug element, and in another extreme position the liquid passage is open.

In practice it turns out that the known system with its rigid-on-rigid connections is often unable to ascertain a fully liquid tight closure of the liquid passage. This may lead to spoilage of liquid on the container, on the sealing unit portions, or into the environment. This is undesirable for many reasons, for example waste, hygiene issues, and an overall bad user experience.

In addition, in practice it turns out that the known system experiences significant wear as a result of the processing of high-PH substances and as a result of temperature changes, for example when processing high-temperature substances. This reduces the lifespan of the container and sealing unit portions, and it further increases the chance that the closure is not fully liquid tight.

It is an aim of the present disclosure to address at least some of the above problems to at least some degree.

It is a further aim to provide sealing unit portions and containers which have a long lifespan, which are easily recyclable at the end of their lifespan, and which are conveniently reusable.

It is a further aim to provide sealing unit portions which create a reliably liquid tight closure.

It is a further aim to provide sealing unit portions and containers which are amenable to use in a broader practice of in-shop, in-workplace, and/or in-home refilling and re-use of containers, so as to provide a technological platform to support a convenient and attractive user experience as well as to support new ways of charging per use.

Overview

According to a first aspect a female sealing unit portion for selectively sealing and opening a container liquid opening in a liquid container for holding a liquid is provided, wherein the female sealing unit portion comprises a tubular element comprising a liquid passage extending in axial direction between an inner opening and an outer opening, wherein the tubular element is configured to be fixedly positioned relative to the container liquid opening so as to provide a liquid connection between the inner opening of the tubular element and the container opening; a valve arranged inside the liquid passage of the tubular element, the valve comprising a tubular valve portion that is axially movable inside the liquid passage relative to the tubular element between a closed position wherein the tubular valve portion closes the liquid passage and an open position wherein the tubular valve portion leaves the liquid passage open, wherein the valve further comprises a valve skirt portion at a first side connected to or integrally formed with a circumferential surface of the tubular valve portion and at a second side connected to or integrally formed with the tubular element and wherein the valve skirt portion comprises a flexible portion configured to bend when the tubular valve portion is moved from the closed position to the open position under influence of an external axial force exerted on a force receiving part of the tubular valve portion and to urge the tubular valve portion back from the open position to the closed portion when the external axial force is removed; wherein the tubular element is configured to removably receive in the liquid passage a rigid operating tube of a male sealing unit portion, the rigid operating tube configured to be axially movable inside the liquid passage of the tubular element so as to engage the force receiving part of the tubular valve portion and apply the external axial force to open the valve portion.

In embodiments of the present disclosure the container can be opened by coupling the male sealing unit portion to the female sealing portion and displace the rigid operating tube so as to engage the valve to an open position. In this situation liquid may be dispensed or discharged easily from the container. In other embodiments, the opening of the container further needs an inner tube, arranged in the rigid operating tube, to be displaced from a closed to an open position as well to be able to dispense or discharge liquid from the container.

Sealing units according to the present disclosure may be closed using a connection of rigid elements or portions against flexible elements or portions, the latter of which may be temporarily deformed instead of being opened and/or closed (primarily) due to liquid pressure. In this way a reliably liquid tight closure may be achieved while few wearing effects are imparted on the moving and closing portions of sealing unit elements.

When using a combination of rigid and flexible element or portions, is important that the configuration of the elements is chosen carefully such that rigid elements or portions do not break or unintentionally permanently deform flexible ones.

Furthermore, sealing unit elements may be used which are all made of the same materials or of materials which may be treated the same way during disposal or recycling. Commonly available materials may be used. Furthermore, polymer materials may be used which are resilient to the relevant types of wearing forces and effects, such as high temperatures and acidic substances.

The reliable liquid tightness which is achieved may make for clean filling, refilling, and pouring, which also makes for easier and more precise dosing.

Female sealing units according to the present disclosure are relatively difficult to open without the corresponding male sealing unit portion. Depending on the degree of fixedness with which a female sealing unit is connected to a liquid container as well as other factors, this results in a substantially tamper-proof connection. It may be more difficult to refill a liquid container provided with such female sealing unit portions without use of devices or refill containers provided by the same or a cooperating manufacturer or distributer.

This tamper-proofness may have several advantages in application. It may mean that a manufacturer or distributer may take in used containers for recycling without requiring inspection for undesirable contents, that charge-per-use business models become easier to provide, and that more control may be had over a user's experience.

In certain embodiments, the tubular valve portion comprises a tube that is closed at one end with an end wall, wherein one or more radial side openings are provided in a side wall of the tube.

In certain embodiments, the flexible portion of the valve skirt portion of the valve comprises an annular straight portion, wherein the annular portion preferably extends at an angle between 30 and 80 degrees, preferably between 40 and 60 degrees, relative to the axial direction of the tubular element.

In certain embodiments, the flexible portion of the valve skirt portion of the valve comprises an annular curved portion.

In certain embodiments, the tubular valve portion defines a radially outer liquid cavity having a hollow cylinder shape which is closed to liquid flow from the axial outside by the valve skirt portion, and a radially inner liquid cavity radially inside the radially outer liquid cavity which is closed to liquid flow from the axial inside when the valve is in the closed position;

wherein the valve is further configured to selectively allow liquid flow between the inner opening and the outer opening of the tubular element via the radially inner liquid cavity when the valve is in the open position.

In certain embodiments, the valve skirt portion is made of material that is more flexible than the material of the remaining portions of the valve.

In certain embodiments, the tubular element comprises a polymer material.

In certain embodiments, the female sealing unit portion further comprising a second tubular element, for instance a cap shell, defining a second liquid passage which contains the tubular element, the second tubular element comprising outward connecting portions, preferably comprising screw thread, for detachably connecting the second tubular element to the liquid container; and inward connecting portions, preferably comprising at least one recessed portion, for fixedly connecting the second tubular element to the tubular element.

In certain embodiments, the second tubular element further comprises an annular recessed portion radially surrounding the inner opening of the tubular element for receiving a fixing portion at the second side of the valve skirt portion of the valve and optionally receiving an axially inward end of the tubular element, so as to attach the valve to the second tubular element or, preferably, to mutually attach the valve, the tubular element, and the second tubular element.

In certain embodiments, the second tubular element further comprises a complementary closing portion radially surrounding the first opening of the tubular element for receiving the inward end of the tubular valve portion to selectively close off the radially outer liquid cavity to liquid flow from the axial inside.

In certain embodiments, the tubular element comprises a circumferential flange, wherein the circumferential flange preferably is configured to connect the tubular element to the second element so as to fixedly position the tubular element relative to the container opening of the liquid container.

In certain embodiments, the tubular element comprises a coupling portion, for instance of a bayonet-type coupling, for allowing coupling of a corresponding male sealing unit portion to the tubular element, wherein the coupling portion preferably comprises one or more recesses to receive corresponding coupling portions of the male sealing unit portion.

In certain embodiments, the tubular element comprises inward guiding portions, for guiding a corresponding male sealing unit portion relative to the force receiving part and/or the radially inner liquid cavity.

In certain embodiments, the valve comprises a fixing portion to fixedly position the valve relative to the tubular element, wherein preferably the fixing portion comprises a flange to hook behind an axially inward end of the tubular element.

In certain embodiments, the valve skirt portion comprises an axial part defining the radial outer boundary of the radially outer liquid cavity, wherein the axial part is configured to extend generally parallel to the inner surface of the tubular element facing the valve, preferably in contact with or close to the inner surface over substantially the entire height of the valve skirt portion.

In certain embodiments, the force receiving part of the tubular valve portion of the valve comprises a ring-shaped flat surface which is perpendicular to the axial direction of the tubular element.

In certain embodiments, the force receiving part of the valve comprises a guiding rim around its radial outside, which extends substantially toward the axial outside.

In certain embodiments, a side wall and an end wall of a tube of the tubular valve portion of the valve are configured to separate the radially outer liquid cavity from the radially inner liquid cavity and/or wherein the radial side openings are only provided in the side wall of the tube, the radial side opening being configured to enable liquid flow between the radially outer liquid cavity and the radially inner liquid cavity.

In certain embodiments, the valve comprises an end wall to close the radially inner liquid cavity to liquid flow from the axial inside, wherein preferably the end wall comprises a central portion which takes an outwardly domed shape in the absence of inward pressure on the force receiving part, and wherein preferably the central portion keeps an outwardly domed shape in the presence of inward pressure on the force receiving part.

In certain embodiments, the valve comprises a flange configured to selectively allow liquid flow from the inner opening of the tubular element to the radially outer liquid cavity, wherein the flange extends toward the radial outside of the valve to selectively close off the radially outer liquid cavity to liquid flow from the axial inside.

Another aspect comprises a male sealing unit portion comprising a rigid operating tube comprising an operating tube liquid passage extending in axial direction between an inner opening and a outer opening, wherein the rigid operating tube is configured to be inserted in a liquid passage of tubular element of the female sealing unit so as to apply an external axial force on a force receiving part of a valve in the female sealing unit, thereby moving the valve from a closed position to an open position.

In certain embodiments, the rigid operating tube further comprising a operating tube coupling portion configured to detachably couple the male sealing unit portion to the corresponding female sealing unit portion, more preferably to an associated coupling portion of the tubular element, wherein the operating tube coupling portion of the male sealing unit portion and the coupling portion of the female sealing unit portion are configured to allow the rigid operating tube to move in axial direction while being in a coupled state.

In certain embodiments, the rigid operating tube and the tubular element of an associated female sealing unit portion are configured to cooperate such that the rigid operating tube is axially movably positioned opposite the liquid passage of the tubular element and the operating tube liquid passage is positioned with the inner opening opposite an outer opening of the liquid passage, wherein preferably the coupling portion is a bayonet-type coupling.

In certain embodiments, the rigid operating tube comprises a tapered end portion shaped to guide the rigid operating tube into the liquid passage of the tubular element of an associated female sealing unit portion.

In certain embodiments, the male sealing unit portion further comprises an annular pressing end surface, wherein the annular pressing end surface is configured to allow a using person or complementary device to have the rigid operating tube apply an external axial force on a force receiving part of a valve of an associated female sealing unit portion.

In certain embodiments, the male sealing unit portion further comprises an inner tube configured to be inserted in the operating tube liquid passage and defining an inner tube liquid passage between least one inner opening, preferably a radial side opening, and at least one outer opening, preferably an axial opening.

In certain embodiments, the inserted inner tube is configured to be movable in axial direction between a closed position and open position so as to open the inner tube liquid passage and to close off the inner tube liquid passage, respectively.

In certain embodiments, the axially movable inner tube is closed at the distal end of the tube facing the valve, preferably by a capping portion, and comprises one or more radial side openings arranged close to the distal end of the inner tube, wherein the one or more side openings are configured to selectively allow liquid to flow from the inner tube liquid passage of the inner tube to the radially inner liquid cavity during filing operation of the liquid container or from the liquid container to the inner tube liquid passage of the inner tube during discharge operation of the liquid container.

In certain embodiments, in the closed position at least one radial side opening of the inner tube is positioned to face a side wall surface in the operating tube liquid passage of the rigid operating tube so as to close off the operating tube liquid passage, and in the open position the least one radial side opening of the inner tube is positioned inside a radially inner liquid cavity of the valve so as to open the operating tube liquid passage to the radially inner liquid cavity of the valve.

In certain embodiments, the male sealing unit portion comprises an actuator configured to move the inner tube relative to the rigid operating tube in axial direction between the open and closed positions.

In certain embodiments, the inner surface defining the second liquid passage of the rigid operating tube is configured to fit the outer surface of the inner tube to prevent liquid flow between the inner and outer surfaces.

In certain embodiments, the male sealing unit portion further comprises an abutment portion, optionally a circumferential flange extending from the tubular wall of the inner tube, for limiting the axial distance a distal end of the inner tube is allowed to move past a distal end of the rigid operating tube.

In certain embodiments, the capping portion extends substantially in a plane perpendicular to the axial direction and/or the inner tune comprising connecting portions extending in an axial direction defining a number of radial side openings to selectively allow liquid flow through the axially outer side of the liquid passage.

In certain embodiments, the capping portion extends radially outward further than the at least one connecting portion, wherein preferably the capping portion limits the moving of the inner tube relative to the rigid operating tube to a predetermined range outward to the closed position.

Another aspect comprises a sealing unit comprising a female sealing unit portion and a male sealing unit portion, wherein the male sealing unit portion is configured to be releasably coupled to the female sealing unit portion.

Another aspect comprises an assembly comprising a liquid container for holding a liquid, for instance a spouted pouch container, the liquid container comprising a container opening and at least one of a female sealing unit portion and a male sealing unit portion.

In certain embodiments, the male and female sealing unit portions are configured to allow liquid to fill the liquid container or liquid to be discharged from the liquid container only if the rigid operating tube has been moved to position both the valve in the open position and the inner tube inside the rigid operating tube in the open position.

In certain embodiments, the female sealing unit portion is configured to be detachably attached to or integrally formed with the liquid container.

In certain embodiments, the liquid container comprises a pouch made of flexible material to allow the liquid container to change its shape and/or size in response to liquid pressure and/or to compressing forces.

In certain embodiments, the liquid container further comprises a rigid outer cassette, wherein the rigid outer cassette is preferably fixedly connected to the first liquid container.

In certain embodiments, the assembly comprises comprising a further liquid container to fill or refill the liquid container, wherein the further liquid container comprises a male sealing unit portion to operate the female sealing unit portion of the liquid container.

Another aspect comprises a use of at least one of a female sealing unit portion, a male sealing unit portion, a sealing unit, and an assembly.

Another aspect comprises a method of selectively sealing and opening a container liquid opening in a liquid container of an assembly, the method comprising moving the female sealing unit portion and the male sealing unit portion relative to each other, to position a rigid operating tube of the male sealing unit portion inside a liquid passage of the female sealing unit portion, such that an axially innermost outer surface of the rigid operating tube comes to rest against a force receiving part of the valve of the female sealing unit portion, further moving the female sealing unit portion and the male sealing unit portion relative to each other so as to have the rigid operating tube exert a force on the force receiving part of the valve to deform a flexible portion of a valve skirt portion of the valve in order to bring the valve to an open position, and moving an inner tube of the male sealing unit portion into an radially inner liquid cavity of the valve to bring also the inner tube to an open position.

In certain embodiments, the method comprises moving the inner tube of the male sealing unit portion out of the radially inner liquid cavity of the valve so as to bring the inner tube to a closed position.

In certain embodiments, the method comprises moving the female sealing unit portion and the male sealing unit portion relative to each other so as to remove the force exerted on the force receiving part of the valve to cause the deformed flexible portion of the valve skirt portion of the valve to bring the valve to a closed position.

In certain embodiments, the method comprises moving the inner tube of the male sealing unit portion into the radially inner liquid cavity of the valve to bring also the inner tube to an open position comprises aligning at least one of the radial side openings of the valve with at least one of the radial side openings of the inner tube.

BRIEF DESCRIPTION OF THE DRAWINGS

The disclosure will be explained in more detail with reference to embodiments shown in the accompanying figures.

FIG. 14A is a cross-sectional view of the tubular element (410) of a push-to-activate embodiment, while

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present disclosure.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

In the following description when reference is made to the concept of a "container", one may consider any type of holder for holding content, for instance a bottle for liquid such as soap or oil. However, the dispenser as described herein is not restricted to application to this specific type of container 200. In fact the dispenser as defined herein may also be applied to any other type of container 200, such as—but not limited to liquid jars, flasks, kegs, cartons, etc. A container may also be an object or system which holds liquid while it is not designed for that purpose, for example a naturally occurring source of liquid.

FIGS. 1-7 show embodiments of sealing unit portions (200, 300) and of various elements (210, 220, 230, 310, 320) of sealing unit portions (200, 300).

Sealing unit portions (200, 300) according to the invention is configured to transfer liquid between a first location and a second location. The sealing unit portions (200, 300) may be advantageously operated in a professional food service or medical environment, but application in other environments also benefits from the advantages of the invention, for example in a home kitchen or bathroom or in a workshop.

The sealing unit portions (200, 300) are suited for transferred a liquid, which may mean a substance which behaves similarly enough to a liquid in flow, which substance may actually be an emulsion, a suspension, or a gel, for example. The sealing unit portions (200, 300) will generally be configured to be suited for use in a generally air-filled environment, wherein the passages and cavities of the sealing unit portions (200, 300) are filled with air in the absence of the liquid to be transferred.

Figure 9B:
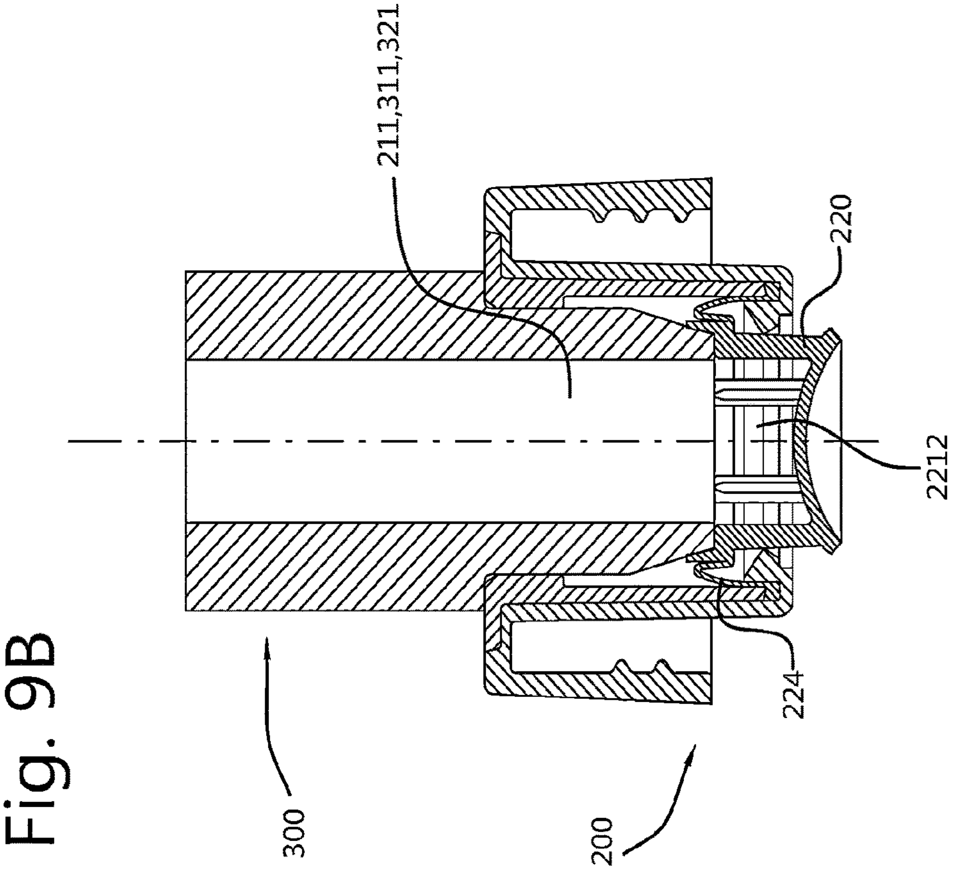
FIGS. 9A and 9B show stages of a pouring operation.
Figure 9A:
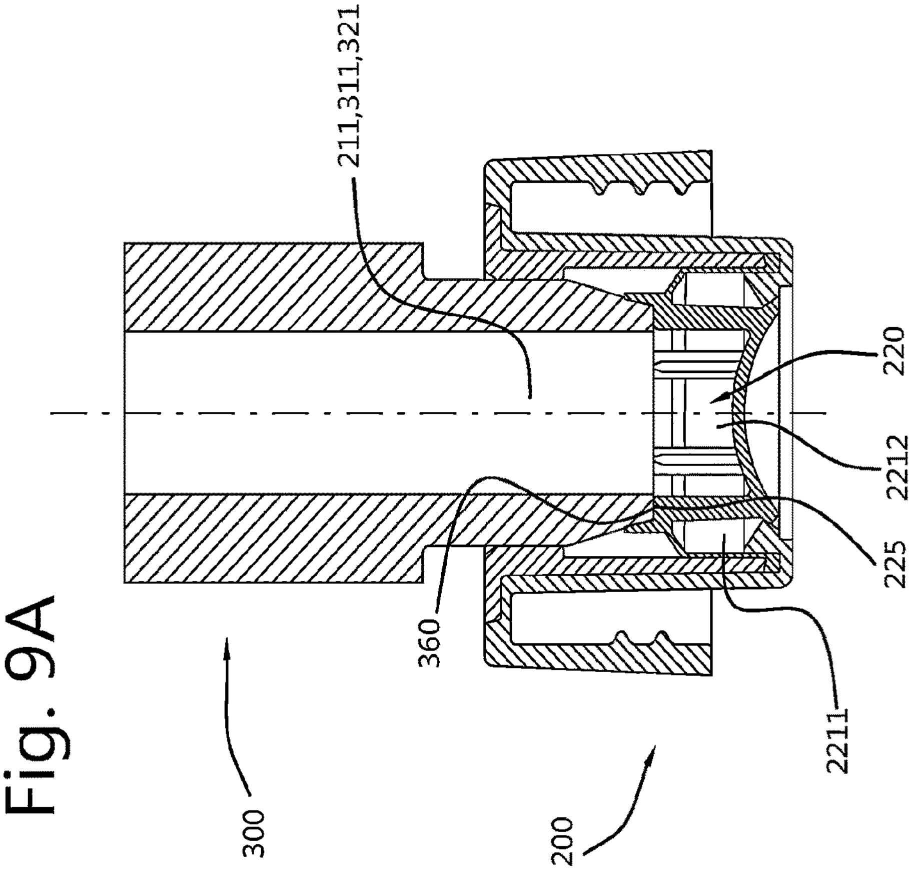

In the figures, the sealing unit portions (200, 300) are shown in a position with the axes (A1, A2) extending toward the top of the figures, but the sealing unit portions (200, 300) may be operated in various orientations relative to the direction of gravity. Operating the sealing unit portions (200, 300) to allow liquid flow is substantially independent of gravity, although to induce liquid flow in a desired direction may depend on gravitational effects. For example, when using the sealing unit portions (200, 300) to pour liquid from a container as shown in FIGS. 9A-B, a user will typically hold the connected sealing unit portions (200, 300) at an angle, for example with the axes (A1, A2) extending closer to horizontal than vertical relative to the direction of gravity, so that liquid will flow out of an attached container (100) in a globally downward direction.

A sealing unit portion (200, 300) may advantageously be manufactured entirely out of polymer materials, for example polypropylene(s) (PE), polyurethane(s) (PU/PUR), polyphenyl ether(s) (PPE), or polyphenylene oxide (blends) (PPO). Preferably the components of the sealing unit portions (200, 300), or at least the elements of each individual sealing unit portion (200, 300) are all made of the same material, or are made of a number of closely related materials which may be treated as belonging to a same class of materials for purposes of manufacturing, recycling, and/or disposal. For example, all elements of a sealing unit portion (200, 300) may be made of polypropylene. In this case, flexible elements may be made of low density polypropylene (LDPE) or of polyphenyl ether, while rigid elements may be made of high density polypropylene (HDPE). In another example, all elements of a sealing unit portion (200, 300) may be made of polyurethane.

The elements of a sealing unit portion (200, 300) may be manufactured by any polymers manufacturing or shaping techniques. Advantageously, all components may be manufactured via injection molding, but alternatively or additionally other techniques like extrusion, 3D-printing, or subtractive processes like machining under computer numerical control (CNC) may be used.

The elements of a sealing unit portion (200, 300) may be configured to be assembled by a system or device, by hand, or by a combination of the two. Substantially no glue and no chemical or temperature-based bonding process may be required at the connections of the elements (200, 300) of a sealing unit portion (200, 300) to attach the various elements to each other during assembly, for example no sets or only one set of connected surfaces of elements of a sealing unit portion (200, 300) may be required to be attached in such ways. Any other connections between the various elements (where required at all) may be made via fitted shapes (for example flanges or fitted rims), or via mechanical connections (for example screw thread, bayonet type closures, or protrusions and recesses to be fixedly connected after a temporary slight deformation of one of the elements).

Figure 1A:
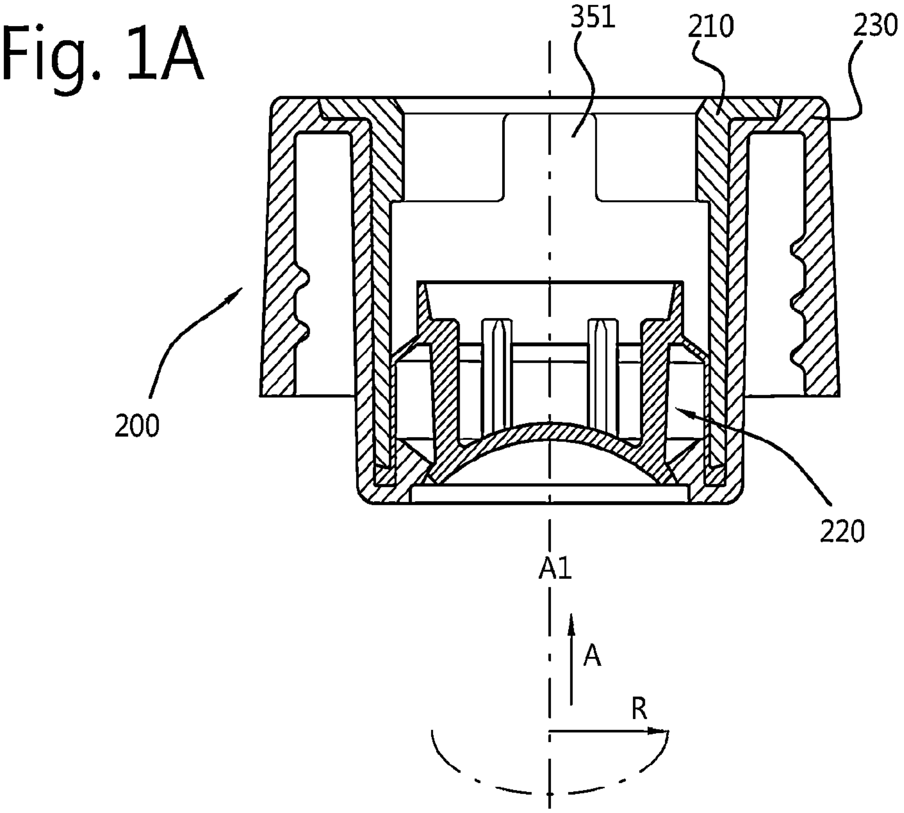
FIGS. 1A and 1B show an embodiment of a female sealing unit portion (200) in a cross-sectional view.
Figure 1B:
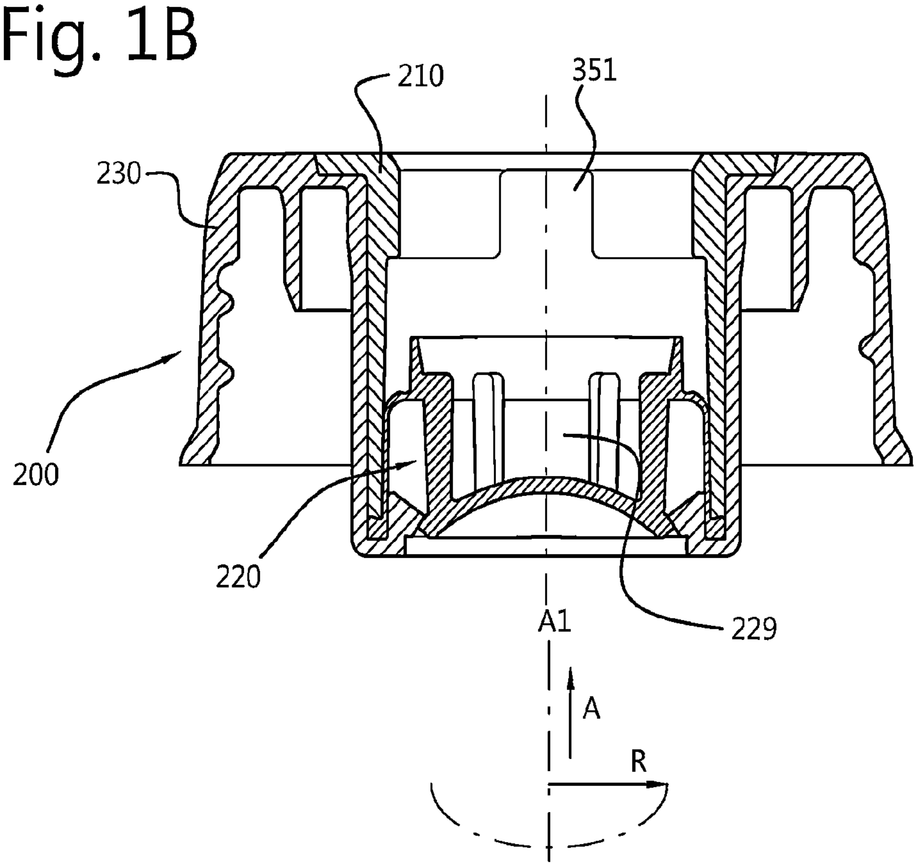

FIGS. 1A-B show an embodiment of a female sealing unit portion (200) relative to a first imaginary axis (A1) with radial (R) and circumferential (C) directions indicated. A female sealing unit portion (200) may be connected to a liquid container (100), as shown in an embodiment in FIG. 10, for selectively sealing and opening a container liquid opening (101) in a liquid container (100) for holding a liquid. The female sealing unit portion may be attached to a liquid container (100), as shown in an embodiment in FIG. 10.

The female sealing unit portion (200) comprises at least two elements, namely a tubular element (210) (for instance a bushing or the like) and a valve (220). The female sealing unit portion may also comprise a cap shell as a separate element. Alternatively, the cap shell may be absent, or the tubular element (210) and the cap shell (230) may be embodied as a single element so that any connecting or attaching portions between them are superfluous and may be omitted. The female sealing unit portion (200) preferably comprises no more elements than a tubular element (210), a valve (220), and optionally a cap shell (230).

Figure 2:
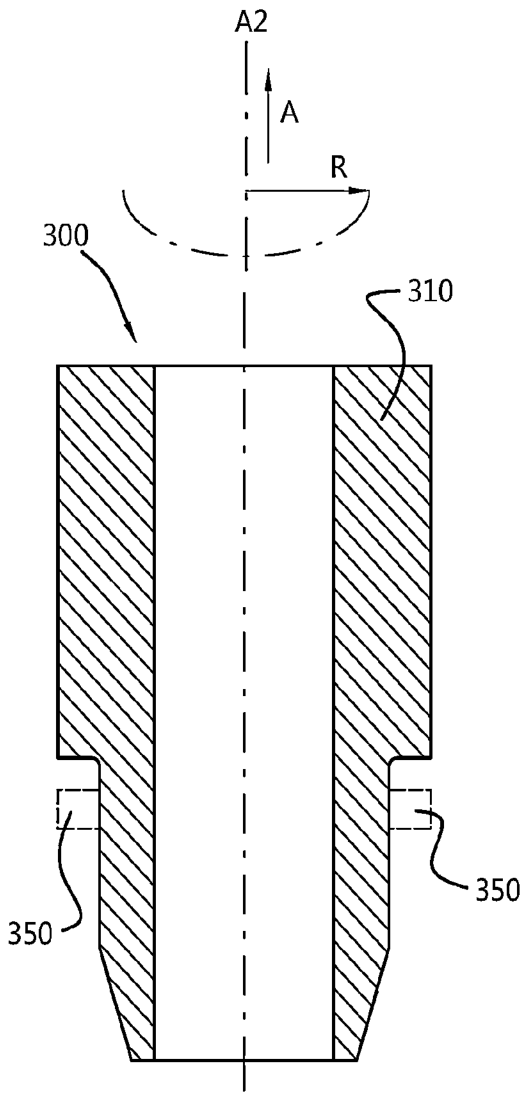
FIGS. 2 and 3 show embodiments of a male sealing unit portion (300) in a cross-sectional view.
Figure 3:
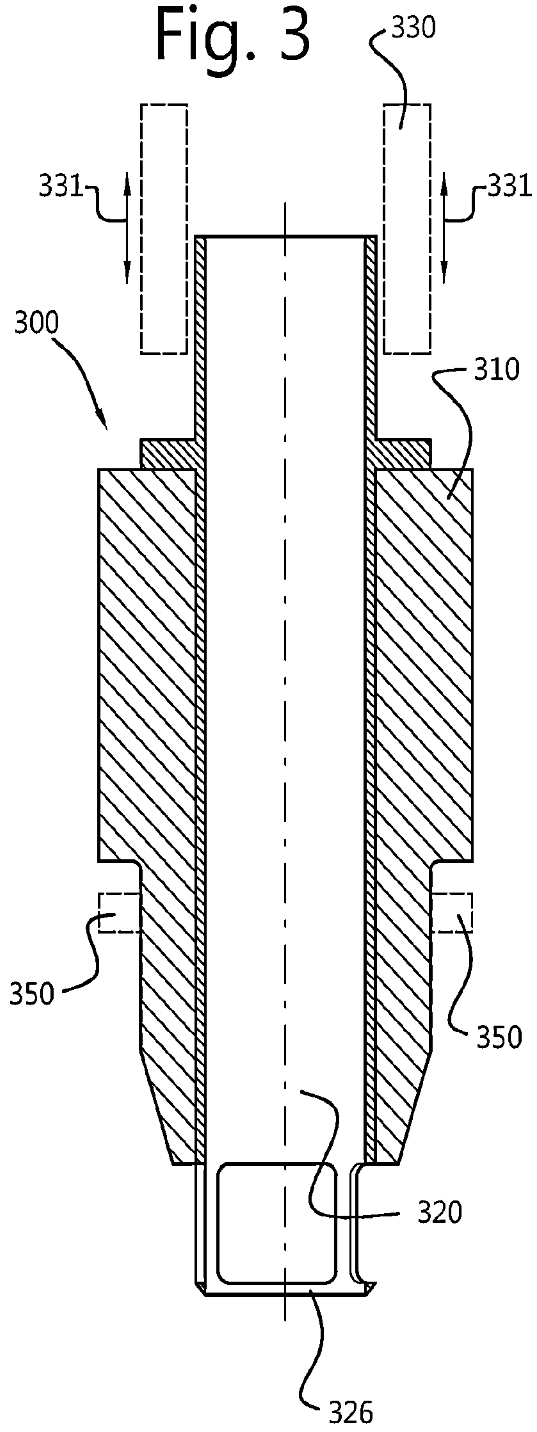

FIGS. 2 and 3 show embodiments of a male sealing unit portion (300) for selectively inducing liquid flow through a liquid passage of a corresponding female sealing unit portion, relative to a second imaginary axis (A2) with radial (R) and circumferential (C) directions indicated.

The male sealing unit portion (300) comprises at least a rigid operating tube (310), and may also comprise a further, inner tube (320). In case the male sealing unit portion (300) comprises an inner tube, the rigid operating tube (310) is an outer tube. The male sealing unit portion (300) preferably comprises no more elements than a rigid operating tube 310 and optionally an inner tube (320).

Limiting the number of elements in a sealing unit portion (200, 300) simplifies assembly and disassembly and reduces the likelihood of the sealing unit portion breaking at a connection point between elements.

FIG. 2 shows a first embodiment of a male sealing unit portion (300) for selectively operating a female sealing unit portion, comprising a rigid operating tube (310). FIG. 3 shows a second embodiment of a male sealing unit portion, comprising a rigid operating tube (310) as an outer tube and an inner tube (320), which may also be rigid.

A female sealing unit portion (200) and a male sealing unit portion (300) may be connected to each other, to form an interoperating assembly. When connected to a liquid container (100), an assembly of a female sealing unit portion (200) and a male sealing unit portion (300) may be used by a user or by a device to selectively allow liquid flow through an opening (101) of the container (100). Examples of this are pouring liquid from the container (100) or, in the case wherein the assembly comprises a male sealing unit portion (300) according to the second embodiment, filling or refilling the container (100). See also FIGS. 8A-C and 9A-B.

Different embodiments of the female sealing unit portion (200) may be configured to connect to different containers (100) or may be configured for different applications. For example, a female sealing unit portion (200) may have a size which is adapted to a specific size of container necks or openings. Different embodiments of the male sealing unit portion (300) may be configured for different applications. Various exemplary applications are described below with reference to FIGS. 10-13.

A collection of one or more embodiments of female sealing unit portions (200) and one or more embodiments of male sealing unit portions (300) may be configured to be interchangeably connected to each other. This has the advantage of providing a user with a system of components to allow different containers to be used interchangeably in various applications and/or with various complementary devices, so as to provide a so-called product line ecosystem wherein a large amount of functionality and convenience is achieved with relatively few components. In such a case, different embodiments of female sealing unit portions (200) and/or different embodiments of male sealing unit portions (300) which may be interchangeably connected to each other may be color-coded to distinguish the different embodiments.

Figure 4A:
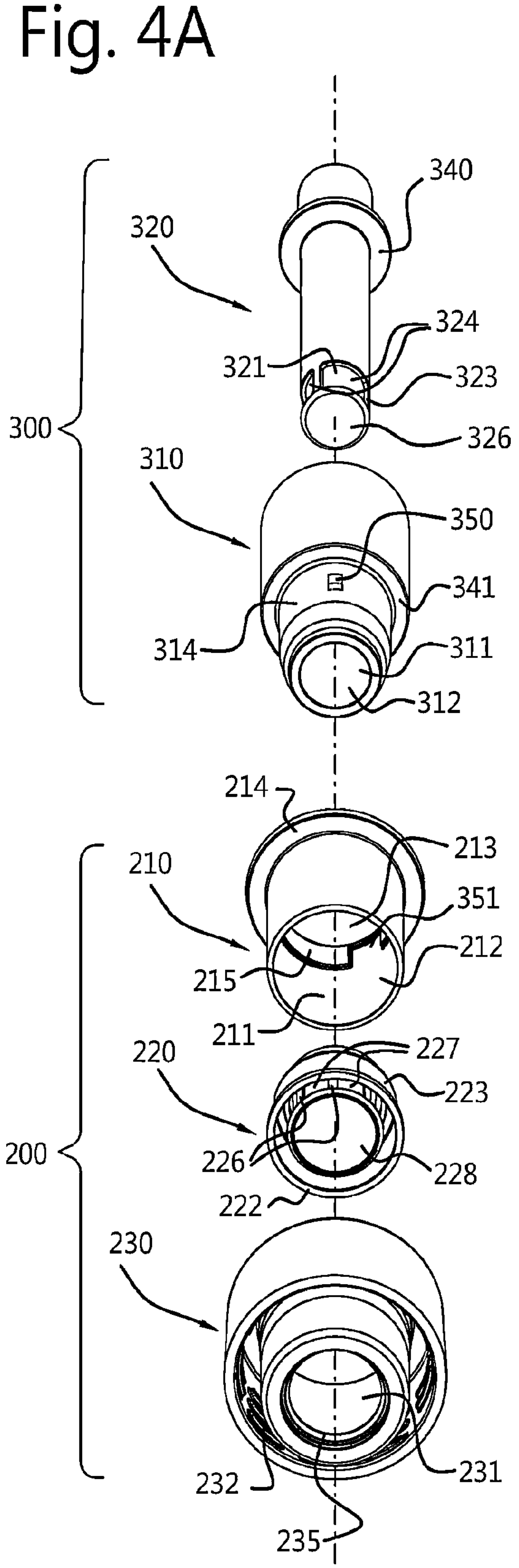
FIGS. 4A and 4B show embodiments of elements of sealing unit portions in an exploded view.
Figure 4B:
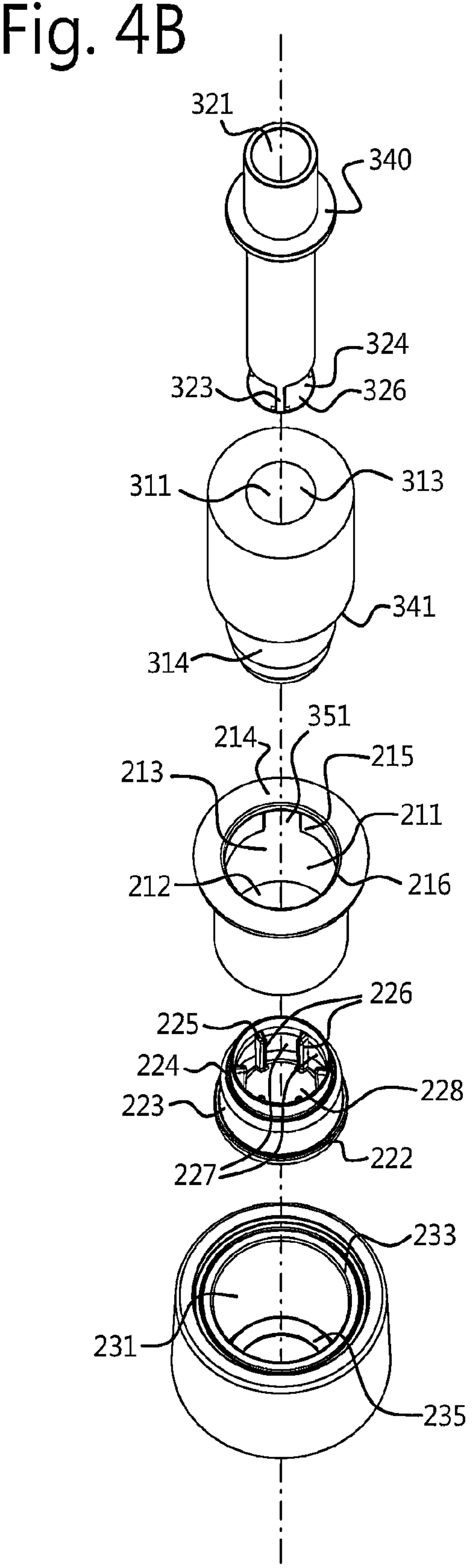
Figure 5A:
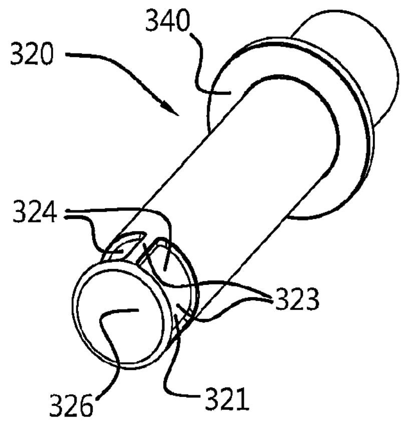
FIGS. 5A, 5B, 5C, 5D, and 5E show embodiments of elements of sealing unit portions in an exploded view.
Figure 5B:
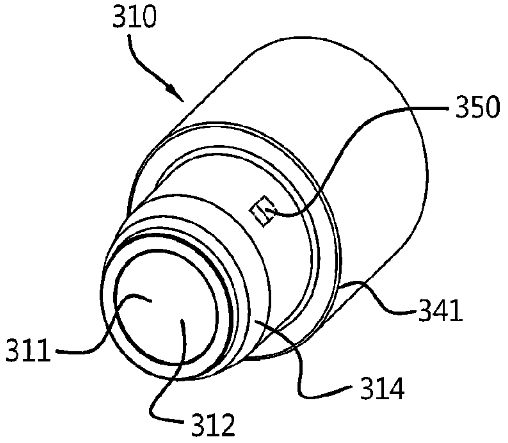
Figure 5C:
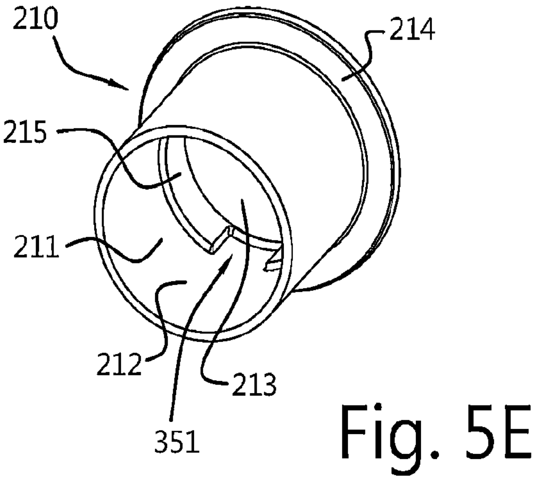
Figure 5D:
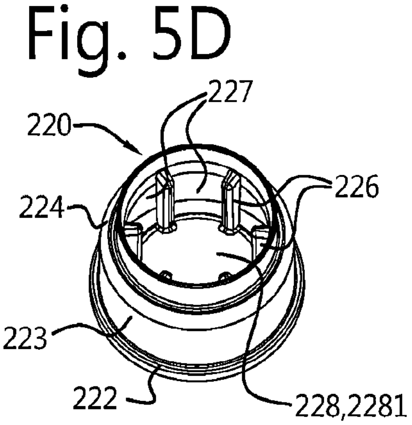
Figure 5E:
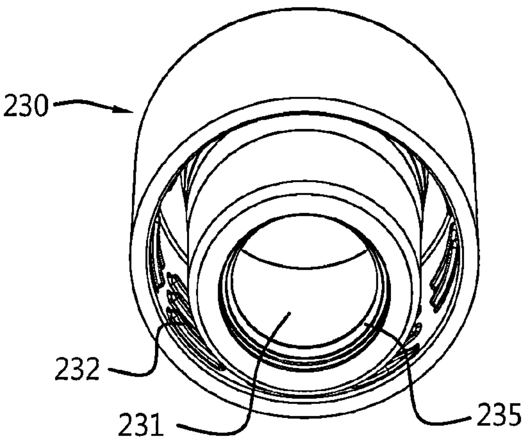
Figure 6A:
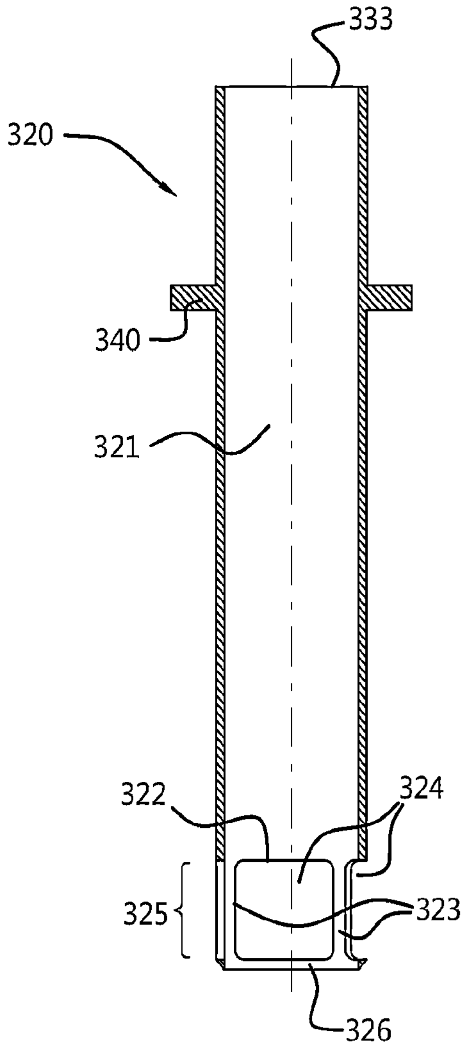
FIGS. 6A, 6B, 6C, 6D, and 6E show embodiments of elements of sealing unit portions in a cross-sectional view.
Figure 6B:
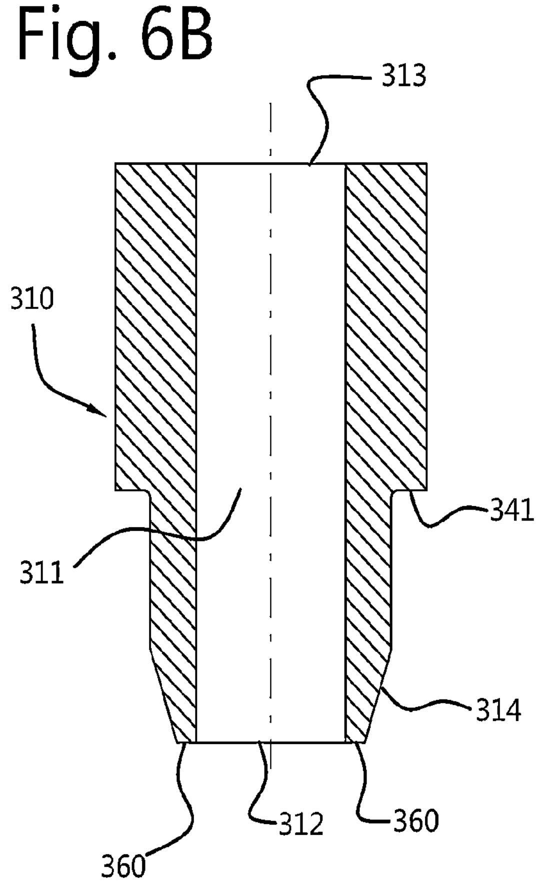
Figure 6C:
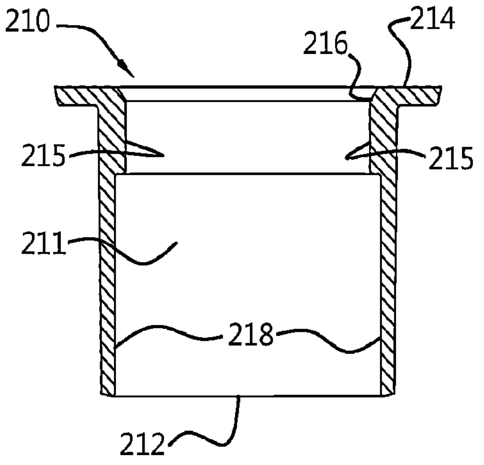
Figure 6D:
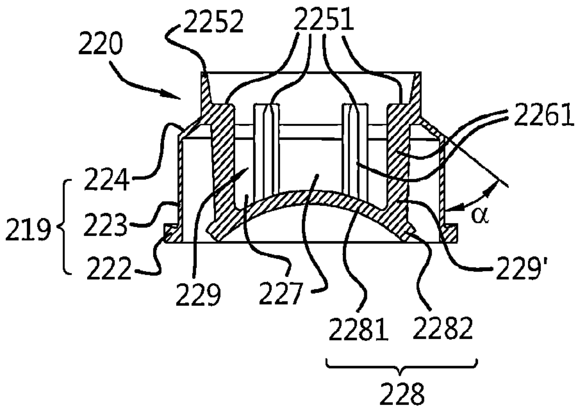
Figure 6E:
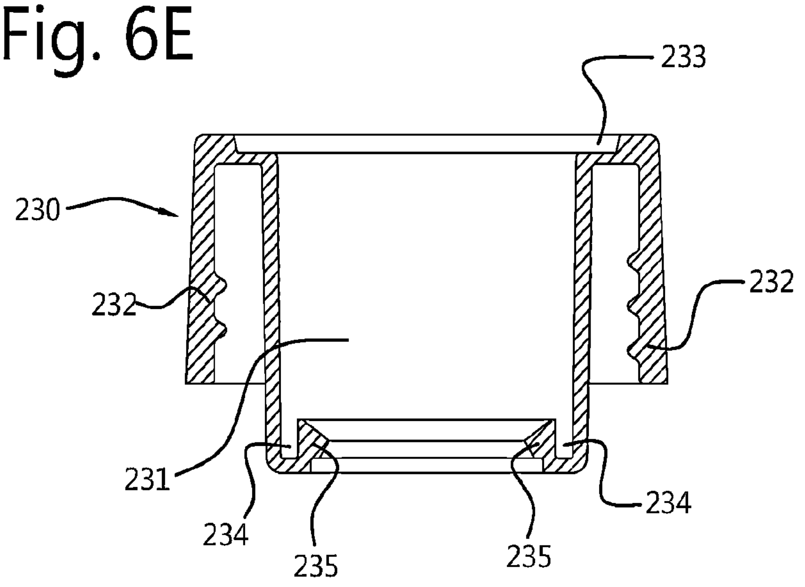
Figure 7:
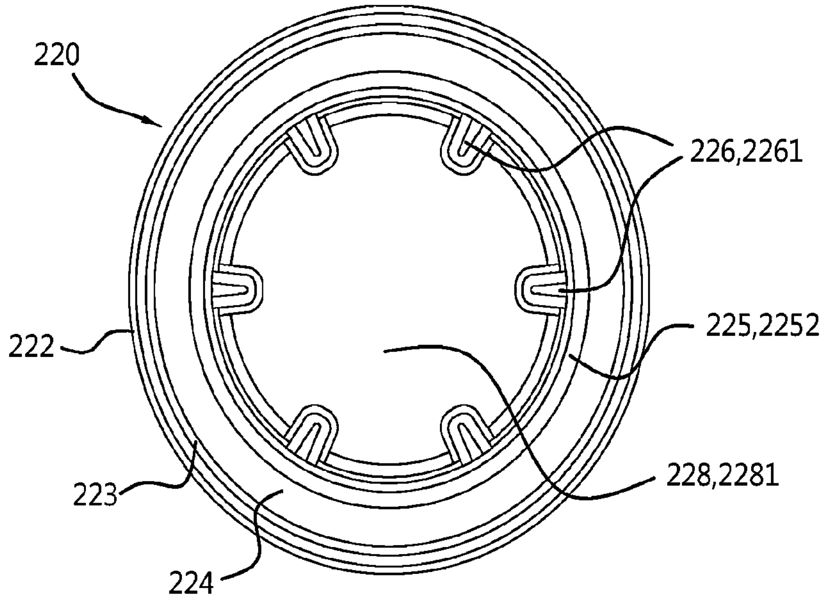
FIG. 7 shows an embodiment of a valve.

FIGS. 4A-B show embodiments of elements of sealing unit portions in an exploded view. FIGS. 5S-E and 6A-E show embodiments of elements of sealing unit portions in exploded and cross-sectional views. FIG. 7 shows an embodiment of the valve (220) in a view along imaginary axis (A1).

Each element of the sealing unit portions (200, 300) may be substantially radially symmetric. One or more elements may comprise radially repeating shapes, such as alternating protrusions and expulsions or radial side openings. One or more elements may comprise internal or external screw thread or other spiral shapes. In case the elements of a sealing unit portion (200, 300) are substantially radially symmetric, the sealing unit portion as a whole will be substantially radially symmetric as well.

FIGS. 4A-B, 5A, and 6A show embodiments of a tubular element (210). The tubular element (210) comprises a liquid passage (211) extending in axial direction (A1) between an inner opening (212) and an outer opening (213), wherein the tubular element (210) is configured to be fixedly positioned relative to the container liquid opening (101) so as to provide a liquid connection between the inner opening (212) of the tubular element (210) and the container opening (101).

In this context, fixedly positioning may mean connecting and/or attaching the tubular element (210) so as to prevent axial movement of the tubular element (210) relative to the connected and/or attached part of the liquid container (100). This may provide the advantage that axial forces applied to the sealing unit portions (200, 300) will be more fully transferred to the opening mechanism, which is helpful when the liquid container (100) is flexible and/or when the assembly is being used by hand.

The depicted tubular element (210) comprises a radially outwardly protruding portion near its axially outward end. Providing at least one such portion may help fixedly position, connect, and/or attach the tubular element (210) relative to the opening (101) of the liquid container (100). These radially outwardly protruding portion are an example of first connecting portions (214) which may alternatively or additionally take other forms.

The depicted tubular element (210) comprises protrusions inside the first liquid passage (211) near its axially outward end. These protrusions serve to detachably connecting the female sealing unit portion (200) to a corresponding male sealing unit portion. These protrusions are an example of coupling portions (215) which may alternatively or additionally take other forms.

The depicted tubular element (210) comprises a guiding portion inside the first liquid passage (211) near its axially outward end. This portion serves to guide a corresponding male sealing unit portion relative to the force receiving part (225) and/or the radially inner liquid cavity (2212). This portion is an example of inward guiding portions (216) which may alternatively or additionally take other forms.

FIGS. 4A-B, 5B, 6B, and 7 show embodiments of a valve (220). The valve (220) may be arranged inside the first liquid passage (211), and may extend substantially across the first liquid passage (211).

The valve (220) comprises a tubular valve portion (229) that is axially movable inside the liquid passage (211) relative to the tubular element (210) between a closed position wherein the tubular valve portion (229) closes the liquid passage (211) and an open position wherein the tubular valve portion (229) leaves the liquid passage (211) open; and a valve skirt portion (219) at a first side connected to or integrally formed with a circumferential surface of the tubular valve portion (229) and at a second side connected to or integrally formed with the tubular element (210).

The valve skirt portion (219) comprises a flexible portion (224) configured to bend when the tubular valve portion (229) is moved from the closed position to the open position under influence of an external axial force exerted on a force receiving part (225) of the tubular valve portion (229) and to urge the tubular valve portion (229) back from the open position to the closed portion when the external axial force is reduced or removed.

The tubular element (210) is configured to removably receive in the liquid passage (211) a rigid operating tube of a corresponding male sealing unit portion, the rigid operating tube configured to be axially movable inside the liquid passage (211) of the tubular element (210) so as to engage the force receiving part (225) of the tubular valve portion and apply the external axial force to open the valve portion.

A radially outer liquid cavity (2211) of the valve may be defined by the valve (220) on the outside of the tubular valve portion (229), having a hollow cylinder shape which is closed to liquid flow from the axial outside. A radially inner liquid cavity (2212) may be defined by the tubular valve portion (229), that is, radially inside a radially outer liquid cavity (2211), if any, which is closed to liquid flow from the axial inside.

The valve (220) is configured to selectively allow liquid flow between the first inner opening (212), the radially inner liquid cavity (2212), and the first outer opening (211) in response to axially inward pressure applied to the valve (220). Depending on the embodiment and the application, the liquid flow may further pass via a radially outer liquid cavity (2211).

The valve (220) may comprise or consist entirely of a flexible sheet, wherein preferably the valve (220) comprises a polymer material.

The depicted embodiment of a valve (220) comprises the following portions from radial outside to radial inside.

The depicted valve (220) comprises a flange. This flange serves to hook behind an axially inward end of the tubular element (210). This flange is an example of a fixing portion (222) which may alternatively or additionally take other forms.

The valve (220) may comprise an axially outwardly extending portion (223) defining the radial outside of a radially outer liquid cavity (2211), wherein the outwardly extending portion (223) is configured to extend along the inside of the tubular element (210), hugging the walls of the first liquid passage (211) over substantially the entire radial outside of the outwardly extending portion (223).

The valve (220) may comprise a first closing portion (2241) which extends radially inwardly, closing a radially outer liquid cavity (2211), if any, to liquid flow from the axial outside, and comprising a flexible portion (224) configured to bend under axially inward pressure and to reassume a resting shape in the absence of the axially inward pressure and a force receiving part (225) configured to receive the axially inward pressure.

As shown in the embodiment of FIG. 1A, the flexible portion (224) of the valve (220) may connect to the outwardly extending portion (223) at an angle, preferably at angle ($\alpha$) between 30 and 80 degrees, preferably between 40 and 60 degrees. As shown in the embodiment of FIG. 1B, alternatively or additionally, the flexible portion (224) of the valve (220) comprises an annular curved portion. This portion curves radially inwardly.

The force receiving part (225) of the valve (220) may comprise a ring-shaped flat surface (2251) which is perpendicular to the first imaginary axis (A1). The force receiving part (225) may alternatively or additionally comprise a guiding rim (2252) around its radial outside, which extends substantially toward the axial outside.

The depicted valve (220) comprises a plurality of pillars (2261) which extend axially inward, and which define radial side openings (227). These pillars (2261) form an axially inwardly extending portion (226) separating the radially outer liquid cavity (2211) from the radially inner liquid cavity (2212). This axially inwardly extending portion (226) serves to enable liquid flow between the inside of the container and optionally the radially outer liquid cavity (2211) on the one hand, and the radially inner liquid cavity (2212) on the other hand, and may take other forms.

The valve (220) may comprise a second closing portion (228) to close the radially inner liquid cavity (2212) to liquid flow from the axial inside. In the depicted valve (220), the second closing portion (228) comprises a central portion (2281) which takes an outwardly domed shape in the absence of inward pressure on the force receiving part (225). The central portion (2281) may keep an outwardly domed shape in the presence of inward pressure on the force receiving part (225). An outwardly domed shape is preferred for the second closing portion (228) in order to strengthen the valve (220) against liquid pressure from inside a connected container and in order to allow an inner tube of a corresponding male sealing unit portion to remove substantially all liquid from the radially inner liquid cavity (2212) of the valve (220) when retracting from the radially inner liquid cavity (2212) of the valve (220).

The depicted valve (220) further comprises a flange (2282) extending toward the radial outside of the valve to selectively close off the radially inner liquid cavity (2212) and optionally the radially outer liquid cavity (2211) to liquid flow from the axial inside. This flange (2282) serves to selectively allow liquid flow from the first inner opening (212) to the liquid cavities (2211, 2212). In case the second closing portion (228) of the valve (220) comprises a flange (2282), the flange (2282) preferably extends the domed shape of the central portion (2281), but other shapes are also possible for an element which serves to selectively allow liquid flow from the first inner opening (212) to the liquid cavities (2211, 2212), as long as a liquid tight connection may be achieved to a portion of another element of the female sealing unit portion (200).

FIGS. 4A-B, 5C, and 6C show embodiments of a cap shell (230). The cap shell (230), when present as element of the female sealing unit portion (200), defines a second liquid passage (231) which contains the tubular element (210), and comprises outward connecting portions (232), preferably comprising screw thread, for detachably connecting the cap shell (230) to the liquid container (100) and inward connecting portions (233), preferably comprising at least one recessed portion, for fixedly connecting the cap shell (230) to the tubular element (210).

The depicted cap shell (230) comprises a recessed portion (234) radially surrounding the first opening (212) of the tubular element (210) for receiving the fixing portion (222) of the valve (220) and optionally an axially inward end of the tubular element (210). This serves to fix the tubular element (210), the valve (220), and/or the cap shell (23) relative to each other. Other types of portions for fixing the elements of the female sealing unit portion (200) relative to each other may alternatively or additionally be provided on the cap shell (230).

The depicted cap shell (230) further comprises a radially inwardly extending portion with a an axially inwardly extending portion at its end, which defines a radially inwardly and axially outwardly sloping receiving surface. The radially inwardly extending portion surrounds the first opening (212) of the tubular element (210). This serves as a complementary closing portion (235) for receiving a portion of the valve (220), for example a flange (2282), to create a liquid tight connection in the absence of axially inward pressure deforming the valve (220), so as to selectively close off the radially outer liquid cavity (2211) to liquid flow from the axial inside. Other types of complementary closing portions for receiving a complementary portion of the valve (220) may alternatively or additionally be provided on the cap shell (230).

In other embodiments, the cap shell (230) may further comprise gripping portions (237), preferably ridges, on its radial outside for increasing the grip of a human hand and/or of a complementary device on the female sealing unit portion (200).

FIGS. 4A-B, 5D, and 6D show embodiments of a rigid operating tube (310). The rigid operating tube (310) comprises an operating tube liquid passage (311) extending in axial direction (A1) between an inner opening (312) and a outer opening (313), wherein the rigid operating tube (310) is configured to be inserted in a liquid passage (211) of tubular element (210) of a corresponding female sealing unit so as to apply an external axial force on a force receiving part of a valve in the female sealing unit, thereby moving the valve from a closed position to an open position.

The depicted rigid operating tube (310) comprises curved portions. These curved portions are an example of radially outwardly arranged guiding portions (314) which serve to guide the rigid operating tube (310) relative to the corresponding female sealing unit portion. Other types of radially outwardly arranged guiding portions to guide the rigid operating tube (310) relative to the corresponding female sealing unit portion may alternatively or additionally be provided on the rigid operating tube (310).

The depicted rigid operating tube (310) comprises an extensive widened section on the outer tube (310). This is an example of abutment portions (341), which serve to limit the moving of the outer tube (310) relative to a corresponding female sealing unit portion to a predetermined range inward. Other types of abutment portions to limit the moving of the outer tube (310) may alternatively or additionally be provided, comprising for example a flange.

The male sealing portion unit (300) may be inserted far enough into the female sealing portion unit (200) that valve (220) is activated (i.e. moved in axial direction from the closed position to the open position) by simply pushing the rigid operating tube (310) into the female sealing portion unit (300). This pushing can be done manually and/or may be accomplished by an actuator configured to move the rigid operating tube (310) in axial directions. Herein such embodiment may be referred to as a "push to activate" embodiment.

In some embodiments of the present application, the rigid operating tube (310) may optionally comprise one or more operating tube coupling portions (350), herein also referred to as connecting portions, configured to detachably connect the male sealing unit portion to the corresponding female sealing unit portion. In several of the embodiments shown in the figures the operating tube coupling portions may be formed by two radial projections arranged at opposite circumferential position of the male rigid operating tube (310).

Furthermore, in embodiments of the present disclosure, for instance in the push-to-activate embodiments shown in FIGS. 1A, 1B, 4A, 4B, 5C and 14A, the tubular element 210 comprises one or more axial recesses 351 at its inner circumferential surface (in the shown embodiments two axial recesses arranged at opposite positions, but in other embodiments only one recess or three or more recesses have been provided). The axial recesses 351 being sized to allow the projections to be moved there along in axial direction. In other embodiments, for instance in the twist-to-activate embodiment shown in FIGS. 14B-14D, the tubular element 410 (identical to the tubular element 210 except for the coupling element 215) comprises one or more generally curved recesses 411 provided in the tubular wall 412. The generally curved recesses 411 extend obliquely with respect to the axial direction and are configured to receive the one or more radial projections of the operating tube coupling portions and allow the projections to move there along.

Referring to the push-to-activate embodiments mentioned above, upon insertion of the rigid coupling tube (310), the one or more radial projections may be moved past the one or more axial recesses (351) in the circumferential coupling portion (215) provided at the inner surface of the tubular element (210). Once the rigid operating tube (310) has reached its axial end position (wherein the valve (220) is fully open), it may be twisted to firmly attach the rigid operating tube (310) to the tubular element (210) of the female sealing portion unit (200). In these embodiments the activation of the valve (220) is accomplished by exerting an external axial force on the male rigid operating tube (310) of the sealing portion unit (300) (for instance by a user pushing the tube in axial direction or by a motor ofr the like doing the same). After activation (i.e. after the valve 220 has been moved to the fully open position) the male and female sealing portion units may be interconnected or mutually coupled by the (optional) operating tube coupling portions (350) and associated coupling portion (215). In specific embodiments, for instance the embodiment of FIG. 14A, the rigid operating tube (310) is rotated or twisted to some extent in order to move the one or more projections in circumferential direction thereby coupling the rigid operating tube (310) to the coupling portion (215). The operating tube coupling portions (350) and the coupling portion (215) together may constitute a bayonet-type of coupling of the male and female coupling portions.

The male and female coupling units may further be configured such that the rigid operating tube (310) is axially movably positioned opposite the liquid passage of the corresponding female sealing unit portion and the second liquid passage (311) is positioned with the second inner opening (312) opposite an outer opening of the liquid passage of the corresponding female sealing unit portion, wherein preferably the operating tube coupling portions or connecting portions (350) comprise a bayonet-type connection.

As mentioned above, in further embodiments of the present disclosure, the activation of the valve (220) is accomplished by a twisting action (the twist-to-activate embodiments). An example of these embodiments is shown in FIGS. 14B-14D and 15A-15E.

In the twist-to-activate embodiments the earlier-mentioned one or more radial projections (350) may be moved along the one or more curved recesses (411) in the circumferential coupling portion (215) provided at the inner surface of the tubular element (210). Because of the curved shape of the recesses 411 the twisting of the rigid operating tube 310 automatically causes the rigid operating tube (310) to be gradually moved in axial direction into the tubular element 210, thereby activating (i.e. opening) the valve 220 in a highly controlled manner. Once the rigid operating tube (310) has been twisted enough to have the projection reach their end positions in recesses 411, the valve (220) is fully opened. In some embodiments of the present disclosure the rigid operating tube 310 then is sufficiently fixed to the tubular element (210) so the rigid operating tube (310) is considered to be coupled to coupling portion (215), especially in case the end part of the recess (411) extends in a generally radial direction, perpendicular to the axial direction.

Figure 14A:
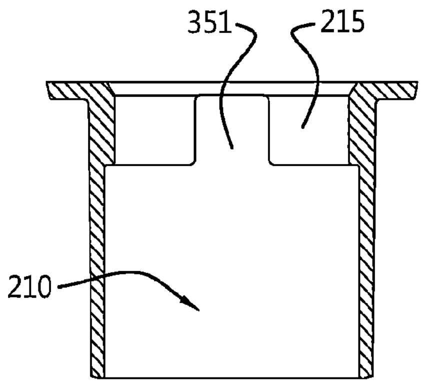
Figure 14B:
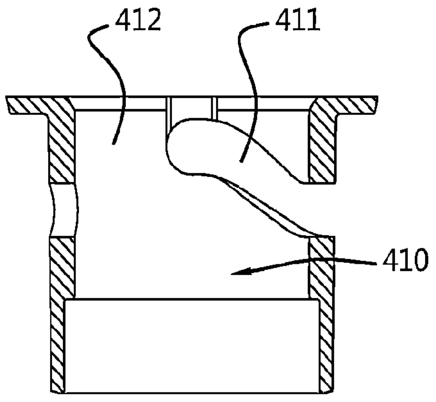
FIGS. 14B, 14C, and 14D are views of a tubular element of a twist-to-activate embodiment, more specifically a cross-sectional view of a tubular element (410), a cross-section of the tubular element arranged inside a cap shell (230), and a top view of the tubular element arranged inside a cap shell (230).
Figure 14C:
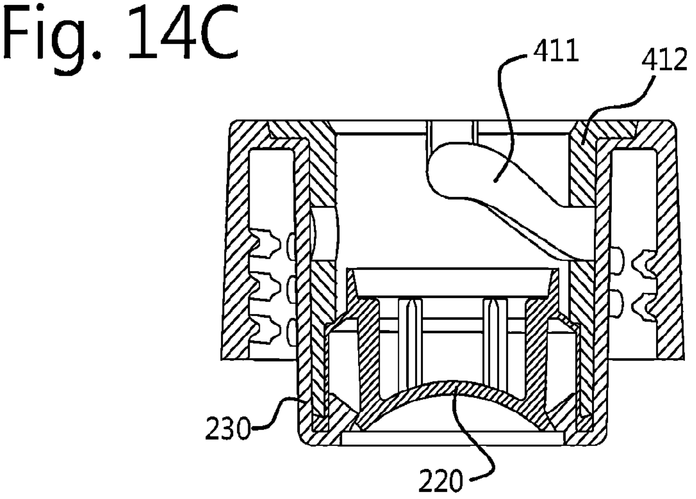
Figure 14D:
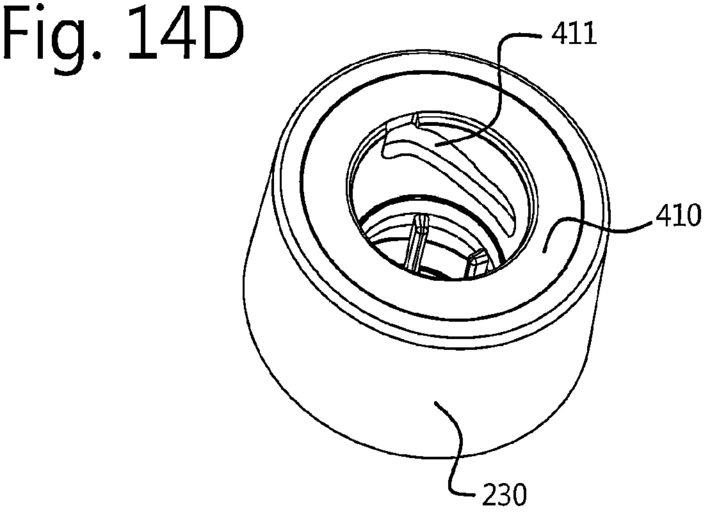
Figure 15A:
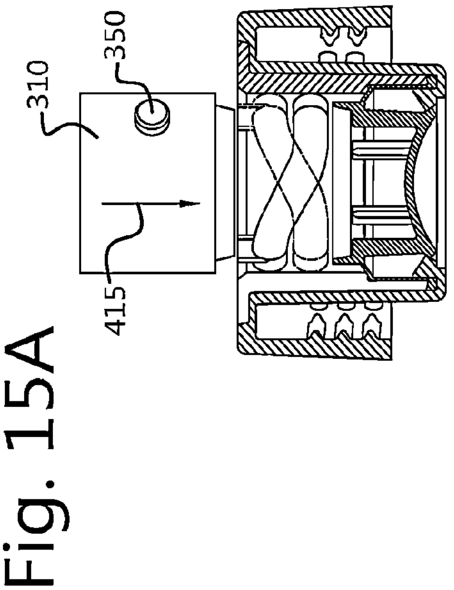
FIGS. 15A, 15B, 15C, 15D, and 15E are cross-sections of the twist-to-activate embodiment of FIGS. 14B-14D, depicting various stages of operation.
Figure 15B:
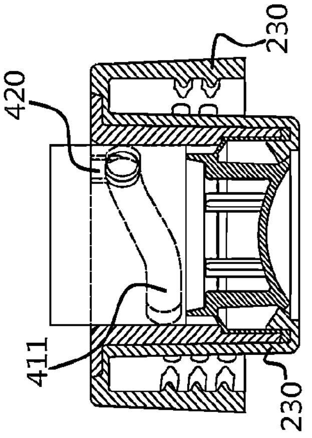
Figure 15C:
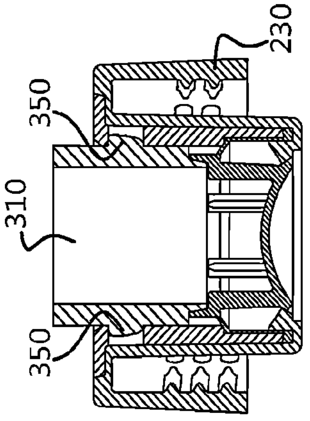
Figure 15D:
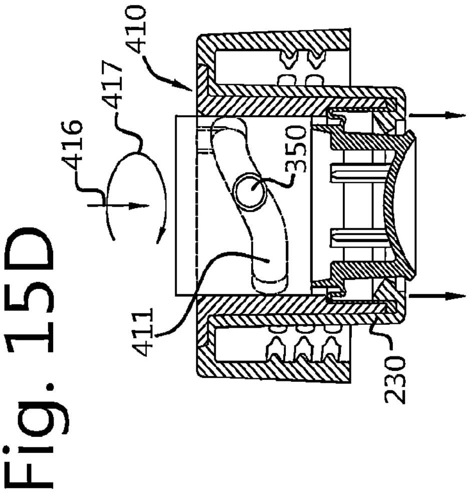
Figure 15E:
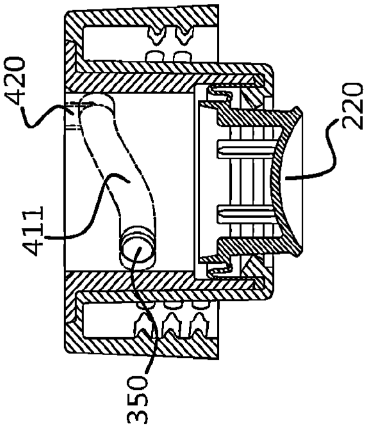

More specifically, the twist-to-activate embodiment shown in FIGS. 14B-14D (the operation of which also being elucidated in FIGS. 15A-15F), makes it possible to generate the axial force needed to activate the valve (220) by having a user or actuator/motor rotate or twist the (rigid operating tube 310) of the male sealing unit portion (rather than pushing the rigid operating tube in axial direction). Upon insertion of the rigid coupling tube (310) (see axial direction 415 in FIG. 15A, showing the so-called plug-in phase), the projections(s) 350 may be arranged via axial input recess part 420 (FIG. 15B) in the respective curved recess(es) 411, as is shown in FIGS. 15B and 15C. These figures depict a starting position, wherein the seal has not yet been activated. Then the user causes the rigid operating tube 310 to twist or rotate (cf. rotational direction 417, FIG. 15D, showing the activation/twisting motion) relative to the tubular element 210 so that the rigid operating tube (310) moves itself in a (downward) axial direction (i.e .axial direction 416, FIG. 15D) towards the valve thereby eventually opening the same (see the open position of FIG. 15E. fully activate position). Due to the specific shape of the curved recess the rigid operating tube 310 remains coupled to the tubular element (210) of the female sealing unit part (locked in end position).

To close the valve (220) the rigid operating tube (310) may be rotated or twisted in opposite direction (opposite to direction 417), so that the valve (220) will move itself back to the closed position due by the presence of the flexible portion of the valve skirt portion of the valve (220).

FIGS. 3, 4A-B, 5A, 6A, 8A-8C show embodiments of an inner tube (320). Preferably, the inside of the second liquid passage (311) of the rigid operating tube (310) is configured to fit the outside of the inner tube (320) to allow no liquid flow radially between the rigid operating tube (310) and the inner tube (320).

The inner tube (320) is configured to be positioned in the second liquid passage (311) and defines an inner tube liquid passage (321) between a third inner opening (322) and a third outer opening (333).

When it comprises an inner tube (320), the male sealing unit portion (300) may further comprise an actuator (330) (schematically shown in FIG. 3) configured to move the inner tube (320) relative to the rigid operating tube (310) along the second axis (A2) in an axially inward or outward direction (331). The actuator (330) may move the inner tube (320) inward up to at least a first position (P1, shown in FIG. 8C) or further to a second position, and back.

The inner tube (320) comprises closing parts (325) to open the axially inner side of the inner tube liquid passage (321) to liquid flow when the inner tube (320) is positioned at the first position (P1), and to close the axially inner side of the inner tube liquid passage (321) to liquid flow when the inner tube (320) is positioned up to a second position (P2) further axially outward than the first position (P1).

The depicted male sealing unit portion (300) comprises a flange on the inner tube (320). This flange is an example of abutment portions (340). These serve to limit the moving of the inner tube (320) relative to the rigid operating tube (310) to a predetermined range inward to a first position (P1). Other types of abutment portions to limit the moving of the inner tube (320) may alternatively or additionally be provided on the inner tube (320). An abutment portion (340) may restrict this range to a distance corresponding to the axial height of radial side openings in the inner tube (320), so that the axially inner end of the inner tube may open fully, but may be stopped before the valve or may move exactly up to the valve. This way a maximum liquid flow is made possible without the risk of the distal end of the inner tube (320) being able to contact (and thereby potentially damage) the valve (i.e. the dome-shaped central portion (2281) of the valve, in certain embodiments of the present disclosure). In practice this distance may be in the order of magnitude of several mm, for instance 3 mm.

The closing parts (325) of the depicted inner tube (320) comprise a capping portion (326) extending substantially in a plane perpendicular to the axial direction (A2) and three connecting portions (323) extending in an axial direction (A2) to connect the capping portion (326) with the rest of the inner tube (320) and defining a number of radial side openings (324) to selectively allow liquid flow through the axially outer side of the liquid passage (311). Other shapes of capping portions may also be provided, as long as they are configured to be able to close the inner tube liquid passage (321). Other numbers or types of connecting portions may also be provided, as long as they define radial side openings (324).

In other embodiments, the capping portion (326) may extend radially outward further than the at least one connecting portion (323), preferably so that the capping portion (326) limits the moving of the inner tube (320) relative to the rigid operating tube (310) to a predetermined range outward to the second position (P2).

Figure 8A:
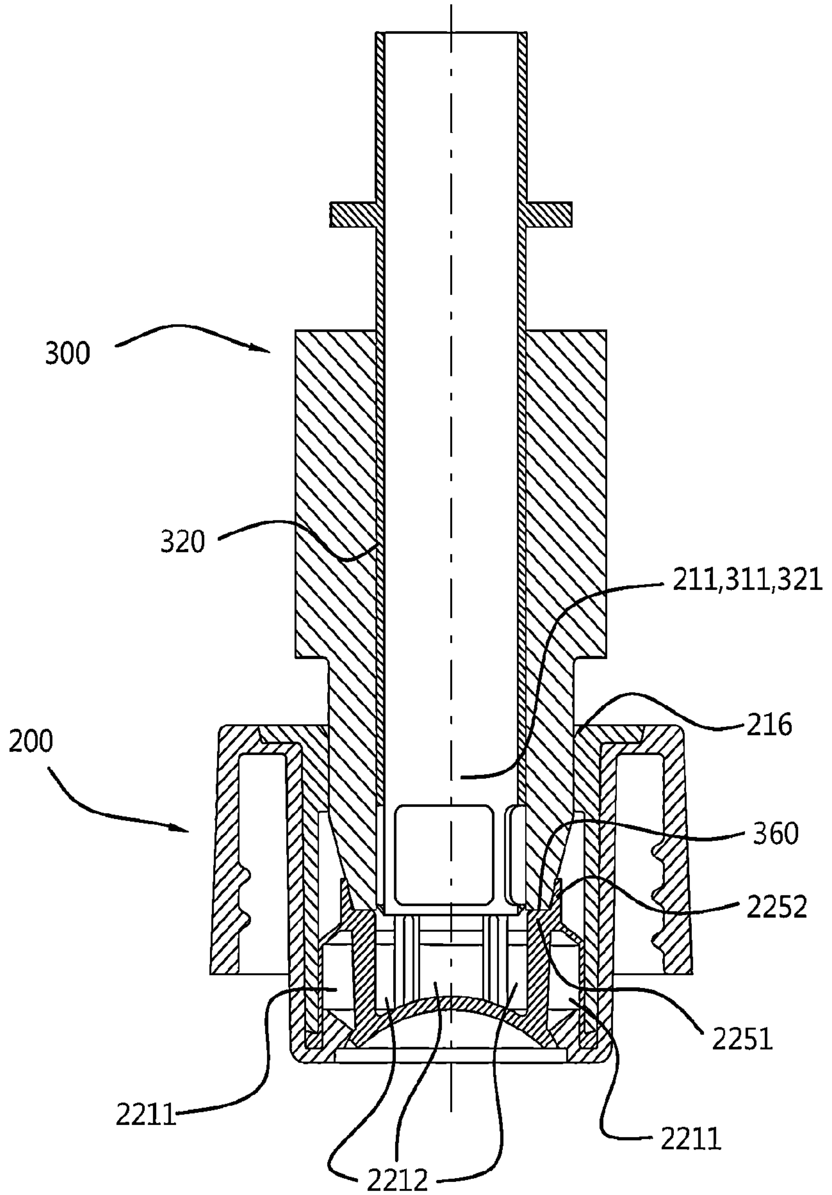
FIGS. 8A, 8B and 8C show stages of a filling or refilling operation.
Figure 8B:
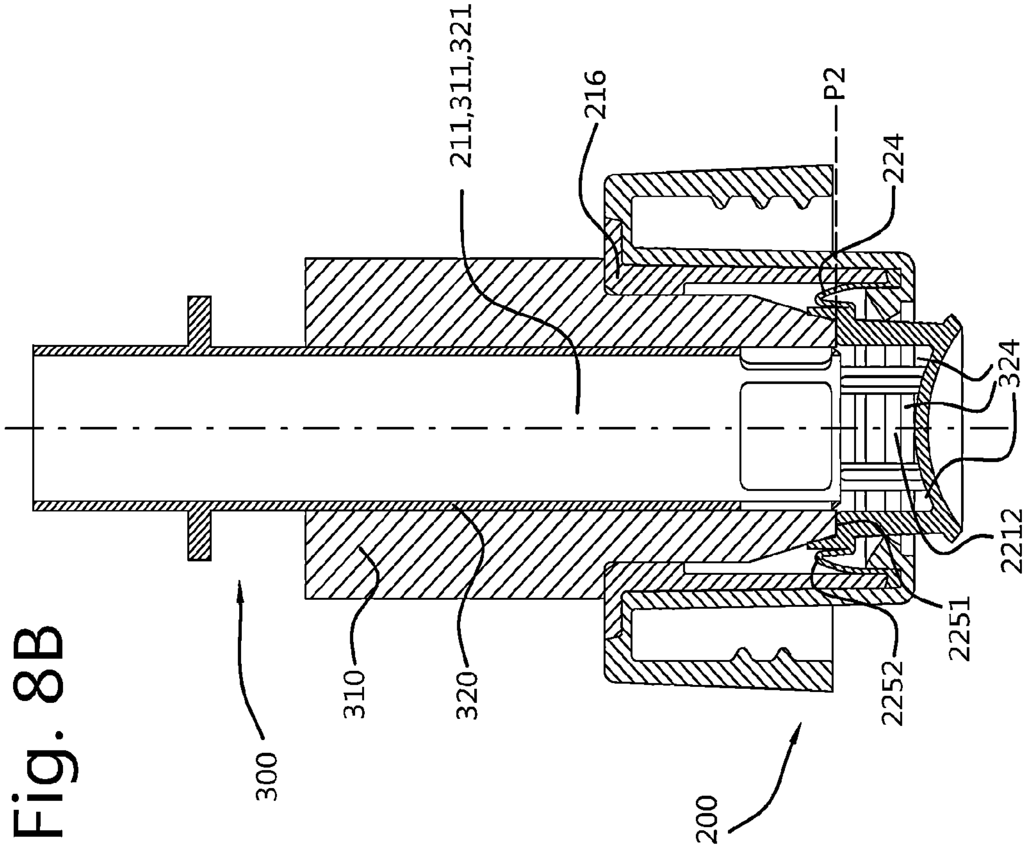

FIGS. 8A-C and 9A-B show embodiments of a female sealing unit portion 200 and a male sealing unit portion 300 in various stages of operations. FIGS. 8A-B show stages of a filling or refilling operation using a male sealing unit portion 300 according to the second embodiment of FIG. 3. FIGS. 9A-B show stages of a pouring operation using a male sealing unit portion 300 according to the first embodiment of FIG. 2.

For filling or refilling it may be preferred to exert more detailed control over liquid flow, for example to prevent liquid which is present inside the second liquid passage (311) of the rigid operating tube (310) before or after a liquid flow is actively induced by the person or device using the male sealing unit portion (300) from flowing into the liquid cavities (2211, 2212) in an uncontrolled manner, which might result in fouling or spoilage. This may be necessary because during filling or refilling, as well as shortly before and after filling or refilling, a higher or lower liquid pressure may be present in the second liquid passage (311) of the male sealing unit portion (300) than in other parts of the assembly.

Figure 8C:
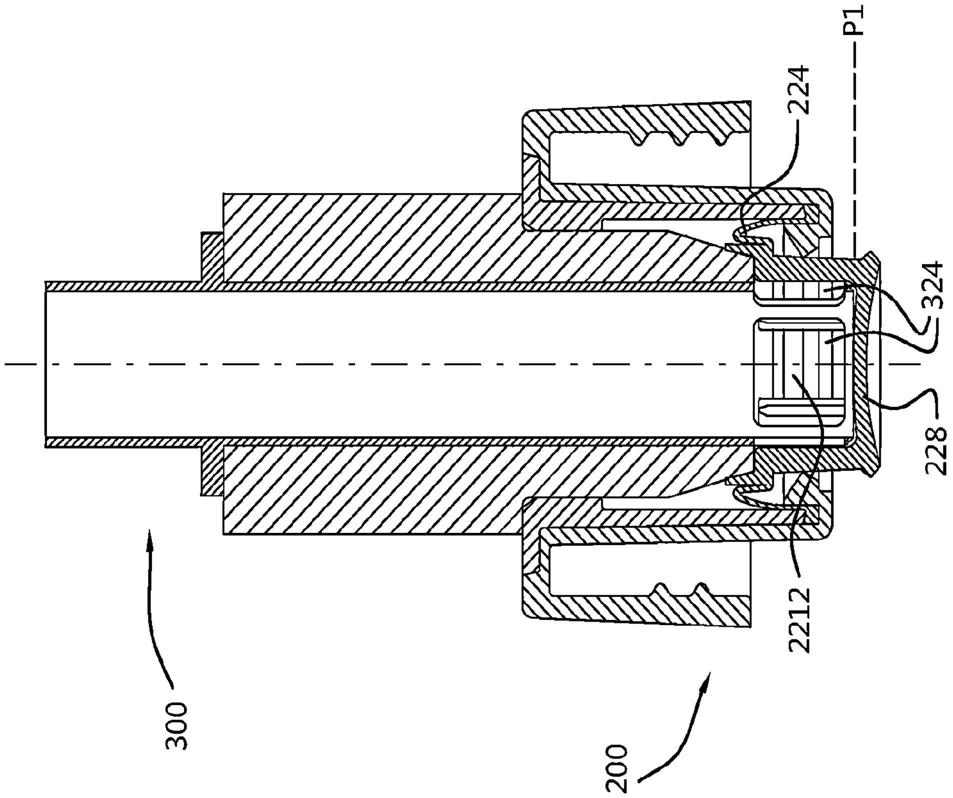

At least for these reasons it may be preferred that an inner tube (320) is present, and the operating stages of FIGS. 8A-C are used. This inner tube (320) may be used to close off the second liquid passage (311) which may be under pressure. This may have the advantages of preventing additional liquid from flowing out of, or being sucked toward, the second liquid passage (311) during the second stage wherein the rigid operating tube (310) is being moved relative to the female sealing unit portion (200), and/or of pulling and/or scraping liquid from the radially inner liquid cavity (2212) to clean the radially inner liquid cavity (2212), and/or of providing time and/or space for any liquid which remains in the radially inner liquid cavity (2212) to flow back into the fluid container (100). All this may reduce or entirely prevent fouling and/or spoilage.

It is noted that the stages illustrated in FIGS. 8A-C and 9A-B may also be used in other applications of the sealing unit portions (200, 300) wherein it is advantageous to exert a similar degree of control over allowing and/or inducing liquid flow.

It is further noted that the figures only show the stages of operation for selectively allowing liquid flow. In order to actually induce liquid flow in a desired direction, further or parallel stages of operation may be required. For example, it may be required to change the orientation of the connected sealing unit portions (200, 300), and/or to apply active propelling or suction forces to liquid by a user, that is, a person or device using the male sealing unit portion (300), by additional portions of the male sealing unit portion (300) or by a connected device. Such stages, portions, or devices are not shown in the figures.

FIG. 8A shows a first stage of filling or refilling, serving to create a substantially liquid tight connection via the first liquid passage (211) and the second and inner tube liquid passages (311, 321), although the latter are still closed by the inner tube (320), and to prepare the connected sealing unit portions (200, 300) for a controlled exertion of pressure between them.

In the first stage, the female sealing unit portion (200) and male sealing unit portion (300) are connected to each other such that the rigid operating tube (310) is inside the first liquid passage (211). In the embodiment shown in FIG. 8A, the rigid operating tube (310) and the first liquid passage (211) are shown with substantially smooth abutting sides, so as to be freely movable relative to each other. In other embodiments the rigid operating tube (310) and the first liquid passage (211) may comprise complementary attaching portions on their abutting sides, so as to detachably attach them to each other, so that the rigid operating tube and the first liquid passage cannot be easily (or accidentally) removed from each other during operation. Such complementary attaching portions may comprise respective complementary portions forming a bayonet type closure.

In this first stage, Inward guiding portions (216) of the tubular element (210) may guide the rigid operating tube (310) so that an axially innermost outer surface of the rigid operating tube (310) comes to rest against a force receiving part (225) of the valve (220), in particular against a ring-shaped flat surface (2251) of the force receiving part (225). A guiding rim (2252) may help guide and/or keep in place the rigid operating tube (310) and may increase the liquid tightness of the connection.

In this first stage, substantially no pressure or other forces are yet exerted between the female sealing unit portion (200) and male sealing unit portion (300). That is, no two elements of the same sealing unit portion (200, 300) are moved relative to each other, and no elements are deformed. A slight amount of pressure may be exerted between the outer surface of the rigid operating tube (310) and the force receiving part (225) so as to create friction and/or to create a better liquid tight connection between the two.

FIG. 8B shows a second stage of filling or refilling, serving to allow liquid flow between the radially inner liquid cavity (2212) and optionally the radially outer liquid cavity (2211) and a connected container (100).

In this second stage, pressure is exerted between the rigid operating tube (310) and the valve (220) to move the rigid operating tube (310) further inward relatively and to deform a flexible portion (224) of the valve (220) in order to move the radially inner portions of the valve (220) axially inward relative to the radially outer portions of the valve (220) and the rest of the female sealing unit portion (200) in particular the complementary closing portion (235) of the cap shell (230). This way the connecting portions (323) and in particular the openings (324) of the valve (320) extend at least partially into the container (100) so as to allow liquid flow from the container to at least the radially inner liquid cavity (2211).

In this second stage, closing parts (325) of the inner tube (320), in particular a capping portion (326), still blocks liquid flow between the (second liquid passage (311) and) inner tube liquid passage (321) and the radially inner liquid cavity (2212).

FIG. 8C shows a third stage of filling or refilling, serving to allow liquid flow between the radially inner liquid cavity (2212) and the (second liquid passage (311) and) inner tube liquid passage (321).

In this third stage, the inner tube (320) is moved axially inward relative to the rigid operating tube (310) and to the female sealing unit portion (200) substantially toward the axial outside of the second closing portion (228) of the valve (220), to allow liquid flow between the radial side openings (270) to the radially inner liquid cavity (2212) and radial side openings (324). To the (second liquid passage (311) and) inner tube liquid passage (321) which are now substantially aligned.

Preferably the width of the (various portions of the) inner tube (320) is adapted to be substantially equal to the width of the radial inside of the radially inner liquid cavity (2212) so that no liquid flow is present radially between them and so that when the inner tube (320) is moved back radially outward, substantially all liquid is pulled and/or scraped from the radially inner liquid cavity (2212) to clean the radially inner liquid cavity (2212). This is advantageous to prevent fouling or spoilage.

It is noted that after operation of the sealing unit portions (200, 300) to allow liquid flow for filling or refilling, and after the induction of liquid flow for filling or refilling, the first to third stages may be repeated in opposite order in order to stop allowing liquid flow. That is, to open the connection comprises first opening the valve, then opening the inner tube, in that order. To close the connection comprises first closing the inner tube, then closing the valve, in that order.

In detail, the inner tube (320) is moved axially outward to stop allowing liquid flow between the radially inner liquid cavity (2212) and the (second liquid passage (311) and) inner tube liquid passage (321). The pressure is reduced or removed between the rigid operating tube (310) and the valve (220) to move the rigid operating tube (310) further outward relatively and to allow the flexible portion (224) of the valve (220) to reform, that is, to take back a resting shape. The female sealing unit portion (200) and male sealing unit portion (300) are detached if required and disconnected from each other.

FIG. 9A shows a first stage of pouring. The first stage of pouring is similar to the first stage of filling or refilling, serving to allow liquid flow between the radially inner liquid cavity (2212) and optionally the radially outer liquid cavity (2211) and a connected container (100). Corresponding features of the second stage of filling or refilling apply here and are not repeated.

FIG. 9B shows a second stage of pouring. The second stage of pouring is similar to the second stage of filling or refilling, serving to create a substantially liquid tight connection via the first liquid passage (211) and the second and inner tube liquid passages (311, 321), and to prepare the connected sealing unit portions (200, 300) for a controlled exertion of pressure between them. Corresponding features of the first stage of filling or refilling apply here and are not repeated.

In this second stage, when using a male sealing unit portion (300) according to the first embodiment, no inner tube is present, so liquid flow between the (second liquid passage (311) and) inner tube liquid passage (321) and the radially inner liquid cavity (2212) is allowed.

It is noted that no third stage is required to allow liquid flow for pouring when using a male sealing unit portion (300) according to the first embodiment, but a third stage is required as in the filling or refilling operation when using a male sealing unit portion (300) according to the second embodiment.

It is further noted that, just as in the filling or refilling operation, after operation of the sealing unit portions (200, 300) to allow liquid flow for pouring, and after the induction of liquid flow for pouring, the first to third stages may be repeated in opposite order in order to stop allowing liquid flow.

In that case, the pressure is reduced or removed between the rigid operating tube (310) and the valve (220) to move the rigid operating tube (310) further outward relatively and to allow the flexible portion (224) of the valve (220) to reform, that is, to take back a resting shape. The female sealing unit portion (200) and male sealing unit portion (300) are detached if required and disconnected from each other.

FIGS. 10-13 show embodiments of devices attached to or comprising sealing unit portions (200, 300) which devices are advantageous in certain applications.

Figure 10:
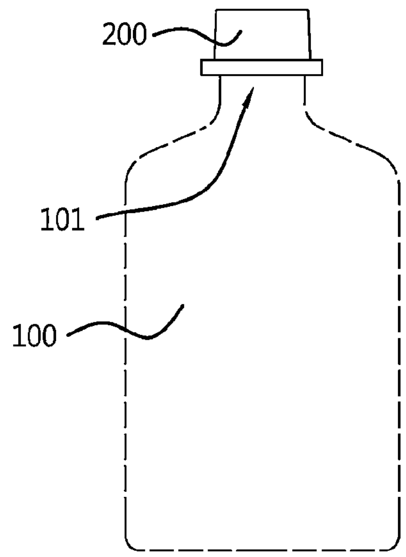
FIGS. 10, 11, 12, and 13 show embodiments of devices attached to or comprising sealing unit portions (200, 300).

FIG. 10 shows an embodiment of a liquid container (100) attached to or comprising a female sealing unit portion (200). The female sealing unit portion (200) is preferably fixedly connected to the liquid container (100). The female sealing unit portion (200) is more preferably integrally formed with the liquid container (100).

The liquid container (100) may comprise a flexible material to allow the liquid container (100) to change its shape and/or size in response to liquid pressure and/or to compressing forces. This allows the container (100) to expand or contract when the amount of liquid in the container (100) changes. In that case, the liquid container (100) may be provided with a rigid outer cassette, which is preferably fixedly connected to the first liquid container (100). A rigid outer cassette protects the liquid container (100) from certain types of damage. A fixedly connected outer cassette may further prevent damage and may prevent tampering.

A female sealing unit portion (200) may comprise sealing portions (236) to close the liquid passage (231) to all liquid flow, which sealing portions (236) are configured to be permanently separated from the female sealing unit portion (200) before first use. This is especially advantageous when the female sealing unit portion (200) is attached to a liquid container (100) to guarantee that the liquid container (100) contains its original content.

In a first example application, a female sealing unit portion (200) is provided as, or as part of, a loose cap to be detachably attached to generally available types of liquid containers, to allow a user to refill the liquid containers using a device which comprises a complementary male sealing unit portion, for example a refilling container or an automated refilling device at a supermarket. This has at least the advantage of reducing spillage during refilling.

In a second example application, a female sealing unit portion (200) is still provided as part of a loose cap, and the user is provided with a dispensing device comprising a complementary male sealing unit portion (300), to allow the user to dispense liquid from the device while the cap remains on the liquid container. This has at least the further advantage of reducing spillage during dosing.

In a third example application, a female sealing unit portion is provided fixedly attached to, or integrally formed with, a liquid container 100. This has at least the further advantage of being substantially tamper-proof. Some connecting portions, for example flanges, may still be advantageously present on the female sealing unit portion (200) or on the liquid container, to allow a user to connect the female sealing unit portion (200) or liquid container 100 to a complementary refilling device.

Figure 11:
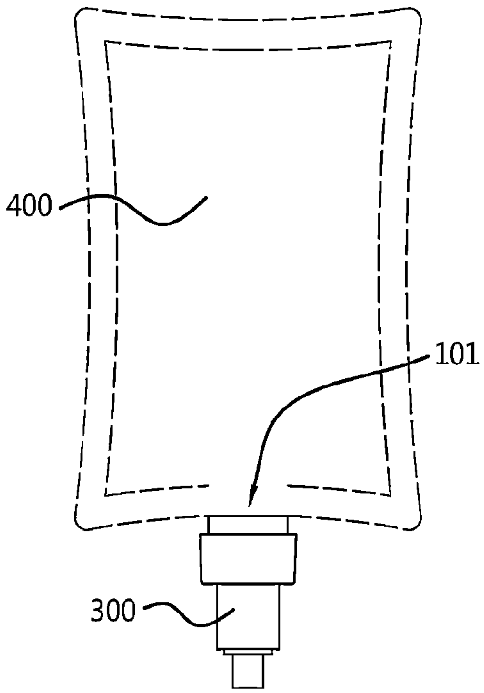

FIG. 11 shows an embodiment of a liquid container (400) attached to or comprising a male sealing unit portion (300). Such a container may be applied as a refilling pouch to fill or refill a complementary liquid container and is preferably configured to be carried and/or operated by a human user.

Certain features of a liquid container (100) attached to or comprising a female sealing unit portion (200) are also advantageous for a liquid container (400) attached to or comprising a male sealing unit portion (300). The male sealing unit portion (300) is preferably fixedly connected to the liquid container (400). The male sealing unit portion (300) is more preferably integrally formed with the liquid container (400). Furthermore, the liquid container (400) may comprise a flexible material and may be provided with a rigid outer cassette, and/or may comprise sealing portions. The relevant details are not repeated here.

Figure 12:
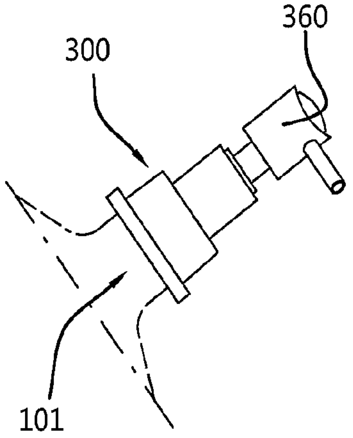

FIG. 12 shows an embodiment of a male sealing unit portion (300) attached to or comprising a pouring head. As a portion of the rigid operating tube (310), or in addition to the rigid operating tube (310), a male sealing unit portion (300) to be used as a pouring head may further comprise a annular pressing end surface (360) substantially on its axial outside.

The annular pressing end surface (360) may be configured to execute a pouring operation. For example, it may allow a using person or complementary device to apply axially inward pressure via the rigid operating tube (310) on the complementary female sealing unit portion, while allowing liquid flow through the second liquid passage (311), to allow a liquid flow to pour liquid via the female sealing unit portion and the male sealing unit portion (300) to the outside.

Figure 13:
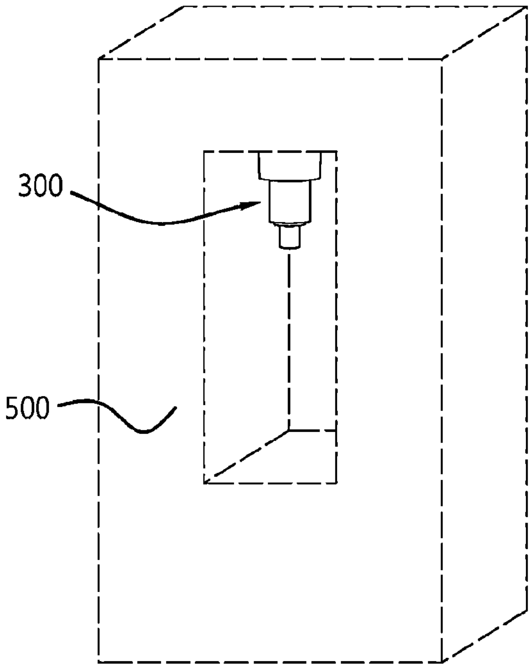

FIG. 13 shows an embodiment of a male sealing unit portion (300) attached to or as part of a refiling device. Such a refilling device may be provided by a manufacturer or distributer, for example in a stationary position in a place of business such as a supermarket. A person may take a used, substantially empty liquid container (100) provided with a female sealing unit portion (200) to the refilling device to refill it. Refilling a liquid container (100) at a refilling device may be an operation comprising the steps of placing the liquid container (100) in a holding element of the refilling device, selecting a liquid to refill the liquid container (100) with. The refilling device may then at least substantially automatically execute further steps to connect the sealing unit portions (200, 300), for example the steps according to FIGS. 8A-C and may induce liquid flow into the liquid container (100) to refill the liquid container (100).

It is noted that a liquid consuming device, for example a dishwasher, may be provided in a similar manner, for example in the workplace or in the home. A person may take an at least partially full liquid containers (100) provided with a female sealing unit portion (200) to the consuming device to provide it with liquid. Operating a consuming device with a liquid container (100 may be an operation comprising the steps of placing the liquid container (100) in a holding element of the consuming device, and setting a mode of the consuming device as with existing devices. The consuming device may then at least substantially automatically execute further steps to connect the sealing unit portions (200, 300), for example the steps according to FIGS. 9A-B and may induce liquid flow out of the liquid container (100) to consume liquid from the liquid container (100).

It is to be understood that this invention is not limited to particular aspects described, and, therefore, may vary. It is also to be understood that the terminology used herein is for the purpose of describing particular aspects only, and is not intended to be limiting, since the scope of the claimed subject-matter will be limited only by the appended claims.

The invention claimed is:

1. A sealing unit for selectively sealing and opening a container liquid opening in a container configured to hold a liquid, the sealing unit comprising:

a female sealing unit portion comprising:

a tubular element comprising a liquid passage extending in an axial direction between an inner opening and an outer opening, wherein the tubular element is configured to be fixedly positioned relative to the container liquid opening so as to provide a liquid connection between the inner opening of the tubular element and the container liquid opening;

a valve arranged inside the liquid passage of the tubular element, the valve comprising a tubular valve portion that is axially movable inside the liquid passage relative to the tubular element between a closed position in which the tubular valve portion closes the liquid passage and an open position in which the tubular valve portion leaves the liquid passage open, wherein the valve further comprises a valve skirt portion at a first side connected to or integrally formed with a circumferential surface of the tubular valve portion and at a second side connected to or integrally formed with the tubular element, and wherein the valve skirt portion comprises a flexible portion configured to bend when the tubular valve portion is moved from the closed position to the open position under influence of an external axial force exerted on a force receiving part of the tubular valve portion and to urge the tubular valve portion back from the open position to the closed position when the external axial force is removed, and wherein the tubular element is configured to removably receive in the liquid passage a rigid operating tube of a male sealing unit portion, the rigid operating tube configured to be axially movable inside the liquid passage of the tubular element so as to engage the force receiving part of the tubular valve portion and apply the external axial force to open the tubular valve portion.

2. The sealing unit according to claim 1, wherein the tubular valve portion comprises a tube that is closed at one end with an end wall, and wherein one or more radial side openings are provided in a side wall of the tube.

3. The sealing unit according to claim 1, wherein the flexible portion of the valve skirt portion of the valve comprises an annular straight portion, and wherein the annular straight portion extends at an angle between 30 and 80 degrees relative to the axial direction of the tubular element.

4. The sealing unit according to claim 1, wherein the flexible portion of the valve skirt portion of the valve comprises an annular curved portion.

5. The sealing unit according to claim 1, wherein the tubular valve portion defines a radially outer liquid cavity having a hollow cylinder shape which is closed to liquid flow from an axial outside by the valve skirt portion, and a radially inner liquid cavity radially inside the radially outer liquid cavity which is closed to liquid flow from an axial inside when the valve is in the closed position, and wherein the valve is further configured to selectively allow liquid flow between the inner opening and the outer opening of the tubular element via the radially inner liquid cavity when the valve is in the open position.

6. The sealing unit according to claim 1, wherein the valve skirt portion is made of a material that is more flexible than a material of the remaining portions of the valve, and/or wherein the tubular element comprises a polymer material.

7. The sealing unit according to claim 5, further comprising:

a second tubular element defining a second liquid passage which contains the tubular element, the second tubular element comprising:

outward connecting portions for detachably connecting the second tubular element to the container; and inward connecting portions for fixedly connecting the second tubular element to the tubular element.

8. The sealing unit according to claim 7, wherein the second tubular element further comprises an annular recessed portion radially surrounding the inner opening of the tubular element for receiving a fixing portion at the second side of the valve skirt portion of the valve, and/or wherein the second tubular element further comprises a complementary closing portion radially surrounding a first opening of the tubular element for receiving an inward end of the tubular valve portion to selectively close off the radially outer liquid cavity to liquid flow from an axial inside.

9. The sealing unit according to claim 1, wherein the tubular element comprises a circumferential flange, and wherein the circumferential flange is configured to connect the tubular element to a second tubular element so as to fixedly position the tubular element relative to the container liquid opening in the container.

10. The sealing unit according to claim 1, wherein the tubular element comprises a coupling portion configured for coupling of a corresponding male sealing unit portion to the tubular element, and wherein the coupling portion comprises one or more recesses to receive corresponding coupling portions of the male sealing unit portion.

11. The sealing unit according to claim 10, wherein the one or more recesses are axial recesses extending in the axial direction of the tubular element or curved recesses extending obliquely relative to the axial direction.

12. The sealing unit according to claim 5, wherein the tubular element comprises inward guiding portions for guiding a corresponding male sealing unit portion relative to the force receiving part and/or the radially inner liquid cavity.

13. The sealing unit according to claim 1, wherein the valve comprises a fixing portion to fixedly position the valve relative to the tubular element, and wherein the fixing portion comprises a flange to hook behind an axially inward end of the tubular element.

14. The sealing unit according to claim 5, wherein the valve skirt portion comprises an axial part defining a radial outer boundary of the radially outer liquid cavity, and wherein the axial part is configured to extend parallel to an inner surface of the tubular element facing the valve.

15. The sealing unit according to claim 1, wherein the force receiving part of the tubular valve portion of the valve comprises a ring-shaped flat surface which is perpendicular to the axial direction of the tubular element and/or wherein the force receiving part of the valve comprises a radial outside that extends toward an axial outside, and a guiding rim around the radial outside.

16. The sealing unit according to claim 2, wherein a side wall and an end wall of a tube of the tubular valve portion of the valve are configured to separate a radially outer liquid cavity from a radially inner liquid cavity, and/or wherein the one or more radial side openings are only provided in the side wall of the tube, the one or more radial side openings being configured to enable liquid flow between the radially outer liquid cavity and the radially inner liquid cavity.

17. The sealing unit according to claim 5, wherein the valve comprises an end wall to close the radially inner liquid cavity to liquid flow from an axial inside.

18. The sealing unit as claimed in claim 1, further comprising:

the male sealing unit portion, wherein the rigid operating tube comprises an operating tube liquid passage extending in an axial direction between an inner opening and an outer opening, and wherein the rigid operating tube is configured to be inserted in the liquid passage of the tubular element of the female sealing unit portion and is configured to contact the force receiving part of the tubular valve portion in the female sealing unit portion so as to apply an external axial force on the force receiving part, thereby moving the valve from the closed position to the open position.

19. The sealing unit according to claim 14, wherein the axial part is configured to be in contact with or close to the inner surface over an entire height of the valve skirt portion.

20. The sealing unit according to claim 17, wherein:

the end wall comprises a central portion which takes an outwardly domed shape in an absence of inward pressure on the force receiving part, and the central portion keeps an outwardly domed shape in a presence of inward pressure on the force receiving part.

* * * * *